United States Patent
Bonnier et al.

(10) Patent No.: US 10,198,794 B2
(45) Date of Patent: Feb. 5, 2019

(54) SYSTEM AND METHOD FOR ADJUSTING PERCEIVED DEPTH OF AN IMAGE

(71) Applicant: CANON KABUSHIKI KAISHA, Tokyo (JP)

(72) Inventors: Nicolas Pierre Marie Frederic Bonnier, Cupertino, CA (US); Anna Wong, Lane Cove (AU); Clement Fredembach, Ultimo (AU); Peter Jan Pakulski, Marsfield (AU); Steven Richard Irrgang, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 15/381,466

(22) Filed: Dec. 16, 2016

(65) Prior Publication Data
US 2017/0178298 A1  Jun. 22, 2017

(30) Foreign Application Priority Data

Dec. 18, 2015 (AU) ................. 2015271935
Dec. 21, 2015 (AU) ................. 2015271981
Dec. 21, 2015 (AU) ................. 2015271983

(51) Int. Cl.
*G06T 5/00* (2006.01)
*G06T 7/11* (2017.01)
(Continued)

(52) U.S. Cl.
CPC ............... *G06T 5/003* (2013.01); *G06T 7/11* (2017.01); *G06T 7/194* (2017.01); *G06T 15/06* (2013.01);
(Continued)

(58) Field of Classification Search
CPC . G06T 7/194; G06T 7/11; G06T 5/003; G06T 15/06; G06T 2207/10028; G06T 2207/20008
See application file for complete search history.

(56) References Cited

U.S. PATENT DOCUMENTS 6,252,982 B1  6/2001  Haisma et al.
8,265,385 B2  9/2012  Hong et al.
(Continued)

OTHER PUBLICATIONS

Dotinga, Why some—including Johnny Depp—can't see in 3D, published May 10, 2011, retrieved online from: https://www.nbcnews.com/healthmain/why-some-including-johnny-depp-cant-see-3d-1C6437360.*
Lee, et al., "Depth-Guided Adaptive Contrast Enhancement Using 2D Histograms", In Proceedings of ICIP2014, Paris, France, Oct. 2014.
(Continued)

*Primary Examiner* — Robert Craddock
(74) *Attorney, Agent, or Firm* — Canon USA, Inc. I.P. Division

(57) ABSTRACT

A system and computer-implemented method of altering perceptibility of depth in an image. The method comprises receiving a desired change in the perceptibility of depth in the image; receiving a depth-map corresponding to the image; and determining at least one characteristic of the image. The method further comprises applying an image process to the image, the image process varying in strength according to the depth map, and in accordance with a non-linear predetermined mapping relating a strength of the applied image process to a change in the perceptibility of depth, the mapping being determined with respect to the identified characteristic.

21 Claims, 15 Drawing Sheets

(51) Int. Cl.
*G06T 7/194* (2017.01)
*G06T 15/06* (2011.01)

(52) U.S. Cl.
CPC .............. *G06T 2207/10028* (2013.01); *G06T 2207/20008* (2013.01)

(56) References Cited

U.S. PATENT DOCUMENTS

| | | | |
|---|---|---|---|
| 8,805,112 B2 | 8/2014 | Hong | |
| 9,110,564 B2* | 8/2015 | Hwang | G06F 3/04817 |
| 9,275,605 B2* | 3/2016 | Longhurst | H04N 1/46 |
| 9,838,669 B2* | 12/2017 | Corral-Soto | H04N 13/026 |
| 2013/0016122 A1* | 1/2013 | Bhatt | G06F 3/04845 345/620 |
| 2013/0258062 A1* | 10/2013 | Noh | H04N 13/0022 348/47 |
| 2015/0116458 A1* | 4/2015 | Barkatullah | H04N 13/0022 348/43 |
| 2016/0188109 A1* | 6/2016 | Wang | G06F 3/011 345/173 |

OTHER PUBLICATIONS

Rößing, et al., "Real-Time Disparity Map-Based Pictorial Depth Cue Enhancement", Computer Graphics Forum 2012, vol. 31, No. 2, pp. 275-284.
Cipiloglu, et al., "A framework for enhancing depth perception in computer graphics", In Proceedings of the 7th Symposium on Applied Perception in Graphics and Visualization, Proceedings from APGV 2010, Los Angeles, California, Jul. 2010, pp. 141-148.
Bhattacharya, et al., "A Holistic Approach to Aesthetic Enhancement of Photographs", ACM Transactions on Multimedia Computing, Communications, and Applications Oct. 2011, vol. 75, No. 1, Article 21, pp. 21:1-21:21.
Luft, et al., "Image Enhancement by Unsharp Masking the Depth Buffer", University of Konstanz, Germany, 2006.
Swain, C. T., "Integration of monocular cues to create depth effect", In Acoustics, Speech, and Signal Processing, 1997. ICASSP-97., 1997 IEEE International Conference on, Proceedings from Acoustics, Speech, and Signal Processing, Munich, Apr. 1997; IEEE: Munich, pp. 2745-2748.

* cited by examiner

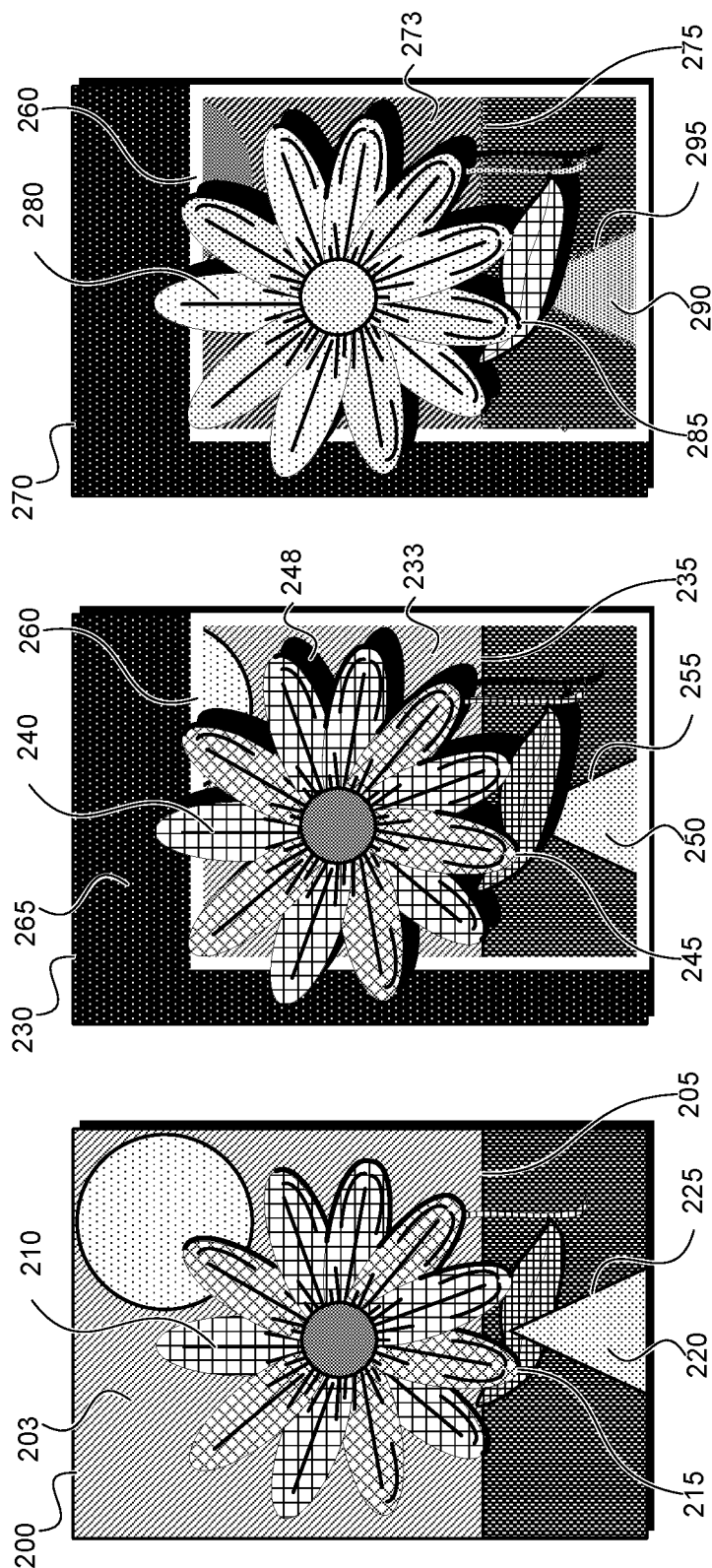

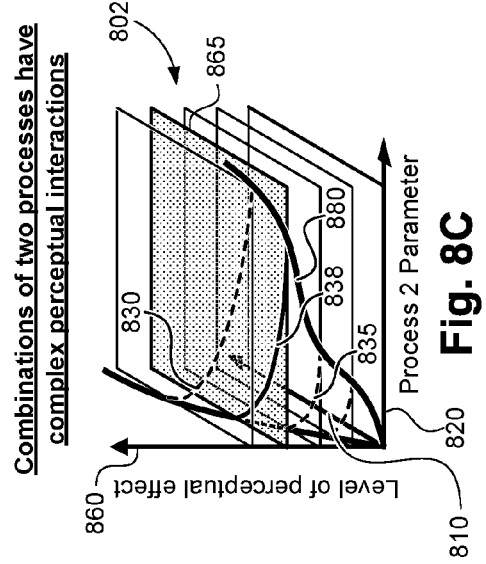
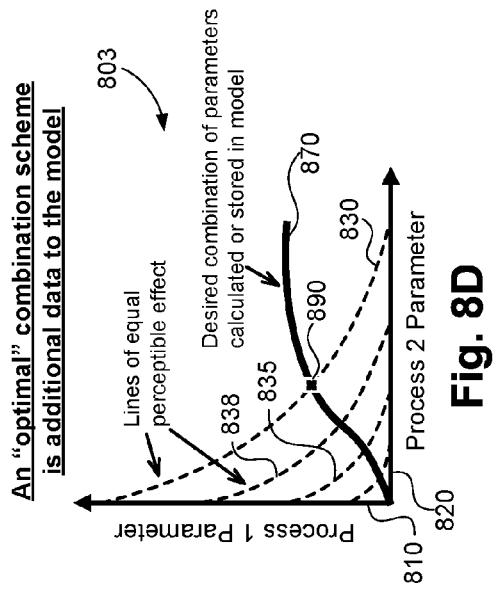
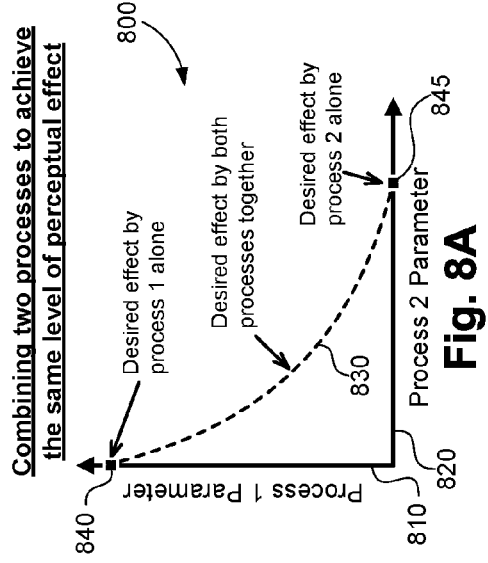
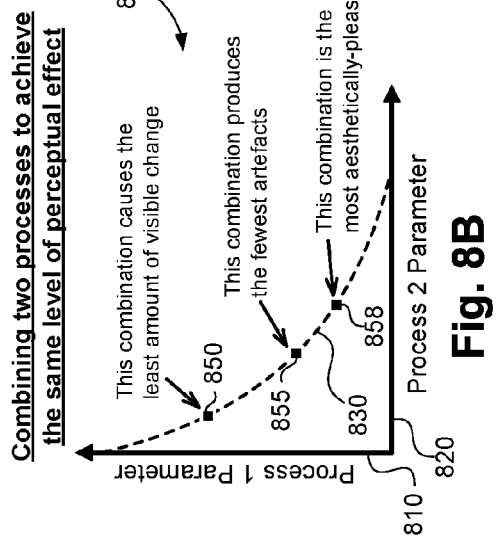

SYSTEM AND METHOD FOR ADJUSTING PERCEIVED DEPTH OF AN IMAGE

REFERENCE TO RELATED APPLICATION(S)

This application claims the benefit under 35 U.S.C. § 119 of the filing date of Australian Patent Application No. 2015271983, filed on 21 Dec. 2015, Application No. 2015271981, filed on 21 Dec. 2015, and Application No. 2015271935, filed on 18 Dec. 2015, which are incorporated by reference in their entirety as if fully set forth herein.

TECHNICAL FIELD

The present invention relates generally to the field of image processing, and, in particular, to the field of processing images according to how they are perceived by humans. The present invention relates to a system and method for applying image processing to an image which adjusts the perceived depth of the objects in the image.

BACKGROUND

Human perception of images relates to visual cues within images. One example of an image cue is bokeh (also referred to as lens-blur) in the foreground and background of an image. The presence of bokeh indicates a short depth of field in a photo, which in turn perceptually indicates the scale of a photographed object to a viewer, even if the object in the photograph is not familiar to that viewer. Manipulating bokeh in an image, for example by a direct blurring or sharpening of different parts of the image, can change how the size and distance of objects in the image are perceived and how the image is interpreted by a viewer, separate to a viewer's ability to see the blurring and sharpening. A key understanding is that what is perceived by the viewer, is different to the change made to the image. A popular feature in compact cameras and image processing software, is the "tilt-shift" or "miniature" effect, in which artificial depth of field is introduced into an image by selective blurring of an image, which results in objects in photographs being perceived by the viewer to be much smaller than their actual size.

"Rittai-kan" represents "a feeling of 3D", or a "sense of depth" of the content of a 2D image. It is an example of a perceived property of an image. Rittai-kan is highly-valued perceptual property by Japanese professional photographers. Some aspects of rittai-kan are compositional and therefore set at the time that an image is captured, and cannot easily be adjusted later.

Other aspects are may be adjusted after capture. Rittai-kan is a perception, affected by image composition and appearance, not tied to any one property or modification of an image.

FIG. 2A shows an image with a small level of rittai-kan, whereas FIG. 2B shows an image with a high level of rittai-kan. FIG. 2A shows an image 200, with a flower 210, in front of a background 203 with a horizon line 205. The flower has a leaf 215 partly occluded by a triangle 220. The triangle has visible edges 225.

FIG. 2B shows a second image 230, which is the result of applying non-photorealistic processes to the image 200 in FIG. 2B in order to give a greater perception of depth to the image. The flower 240 appears as before, but changes have been introduced to its leaf 245 and the background 233. To create a "pop-out" effect, part of the background 265 has been blacked-out, and a frame 260 has been drawn around the remaining background 233, passing behind parts of the flower 240. To change the apparent order of objects in the image, the flower's leaf 245 has been inpainted to cover the triangle 250. To give the flower 240 the appearance of floating above each of the remaining background 233, the introduced background 265 and frame 260, a drop-shadow 248 with the same shape as the flower 240 has been drawn behind the flower but over those elements.

The example manipulations in FIG. 2B are overt, they change how the relative depths and distances in the image are perceived by a viewer, even though the image is still two-dimensional. The example manipulations in FIG. 2*b* are examples of "monocular depth cues". A number of monocular depth cues are known, and these may be applied to a 2D image to change the rittai-kan (perception of depth) in the image while still outputting a 2D image. Monocular depth cues affecting rittai-kan include, for example, perspective lines, aerial perspective (also known as distance-haze), texture gradients, lighting and shading, and defocus blur. A number of non-photorealistic manipulations are currently known and applied in software.

Some methods for manipulating images to introduce monocular cues and combining the monocular cues to increase perceived depth of an existing image are known. Achieving such edits in a photorealistic manner is particularly difficult. Typically, the skill to make photorealistic edits, in order to change how an image is perceived, is in the domain of fine-arts and skilled artists. Often, the development of this skill is intuitive or non-technical. Learning the art of incorporating different perceptual aspects into an image is time-consuming and inexact. A user may know that they wish to increase the rittai-kan of a realistic image, but may not have the skills, experience or time to achieve a suitable natural effect. There exists a need for an improved approach to modification of rittai-kan in an image.

SUMMARY

It is an object of the present invention to substantially overcome, or at least ameliorate, one or more disadvantages of existing arrangements.

One aspect of the present disclosure provides a computer-implemented method of altering perceptibility of depth in an image, the method comprising: receiving a desired change in the perceptibility of depth in the image; receiving a depth map corresponding to the image; determining at least one characteristic of the image; and applying an image process to the image, the image process varying in strength according to the depth map, and in accordance with a non-linear predetermined mapping relating a strength of the applied image process to a change in the perceptibility of depth, the mapping being determined with respect to the determined at least one characteristic.

Another aspect of the present disclosure provides a computer-implemented method of altering perceptibility of depth in an image, the method comprising: receiving a desired change in the perceptibility of depth in the image; determining at least one characteristic of the image based on a measured difference of the at least one characteristic in a foreground region of the image and a background region of the image; selecting an image process for altering the perceptibility of depth in the image, said selected process having a different perceptual impact in the foreground region and the background region of the image as a result of the determined at least one characteristic in the regions; and applying the image process globally to the image, in accordance with a non-linear predetermined mapping relating a strength of the globally applied image process to a change in perceptibility of depth.

Another aspect of the present disclosure provides a computer-implemented method of altering perceptibility of depth in an image, the method comprising: receiving a desired change in the perceptibility of depth in the image; deteremining at least one characteristic of the image; and applying a combination of at least two image processes to the image, wherein a process strength of the combination is determined in accordance with corresponding non-linear predetermined mappings relating the strengths of the at least two applied image processes and the perceptibility of depth in the image, said mappings being determined with respect to the determinined at least one characteristic.

In one aspect, the at least two image processes are each associated with a predetermined effectiveness measure, and wherein the strengths of the applied image processes are determined according to the associated effectiveness measure.

In one aspect, the at least one characteristic is determined with respect to a foreground region and a background region of the image.

In one aspect, application of the image process to the image is a local application limited to one of a foreground and background region of the image.

Another aspect of the present disclosure provides a computer-implemented method of interacting with an image displayed on a display screen to alter perceptibility of depth in the image, said method comprising: receiving a selection of a region of the displayed image and an indication associated with a desired change in the perceptibility of depth in the image; and applying an image process to the selected region of the image to change the perceived depth of the image wherein size and position of the image remain constant.

In one aspect, the indication is received in the form of at least one of a gesture, a voice command to an object, and a vocal request to an image of a person in the image.

In one aspect, the indication is received in the form of ray-casting from a user gesture.

In one aspect, the indication is received in the form of a pinch gesture.

In one aspect, the region of the image is selected by at least one of user indication and automatic segmentation.

In one aspect, the image process relates to one of clarity, sharpness, colour shift, saturation, brightness, exposure, noise, contrast and vibrance of the image.

In one aspect, the percetibility of depth in the image relates to one or more of foreground/background separation, a sense of volume in objects in a scene of the image, and a sense of physicality in object textures of the image.

Other aspects of the invention are also disclosed.

BRIEF DESCRIPTION OF THE DRAWINGS

One or more example embodiments of the invention will now be described with reference to the following drawings, in which:

FIGS. 2A to 2C show a combination of artificial and photorealistic methods of increasing rittai-kan in an image;

FIGS. 8A to 8D show detail of how multiple image adjustment processes interact to adjust the level of rittai-kan in an image;

DETAILED DESCRIPTION INCLUDING BEST MODE

Figure 1A:
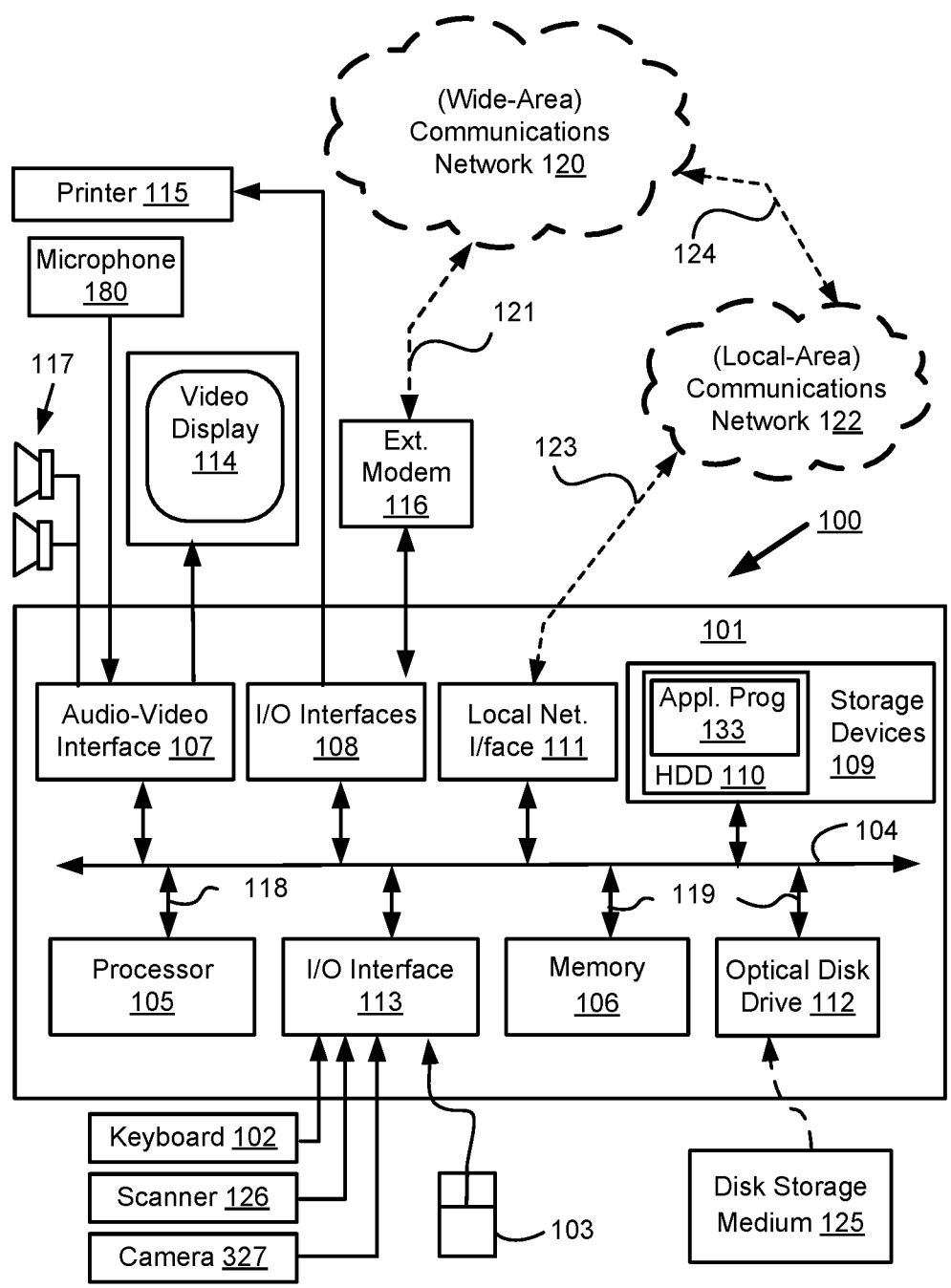
FIGS. 1A and 1B are schematic block diagrams of a general purpose computer on which the embodiments of the invention may be practised.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventor(s) or the patent applicant that such documents or devices in any way form part of the common general knowledge in the art.

Figure 1B:
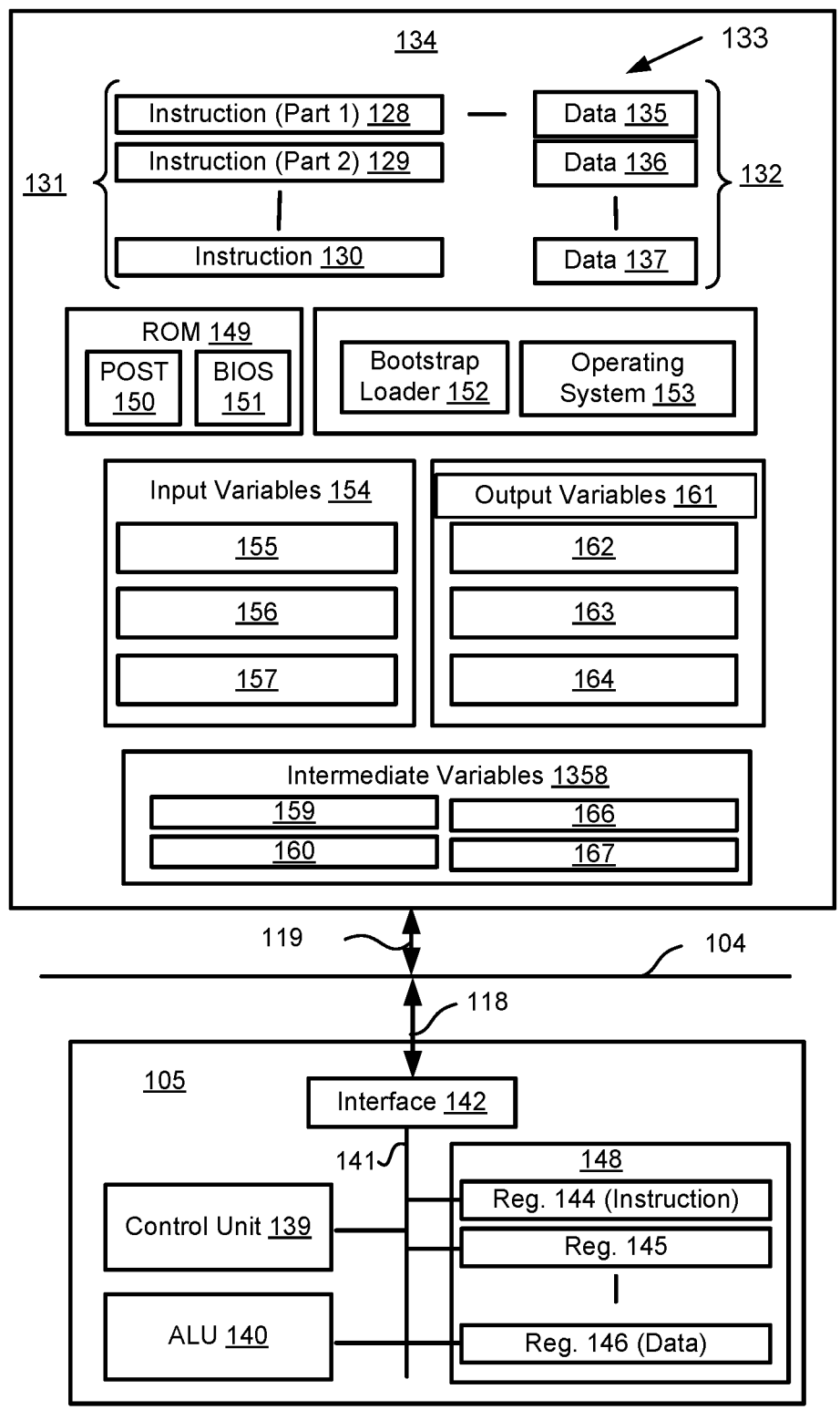

FIGS. 1A and 1B depict a general-purpose computer system 100, upon which the various embodiments of the invention described below can be practiced.

As seen in FIG. 1A, the computer system 100 includes: a computer module 601; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 11. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer systems.

Figure 13:
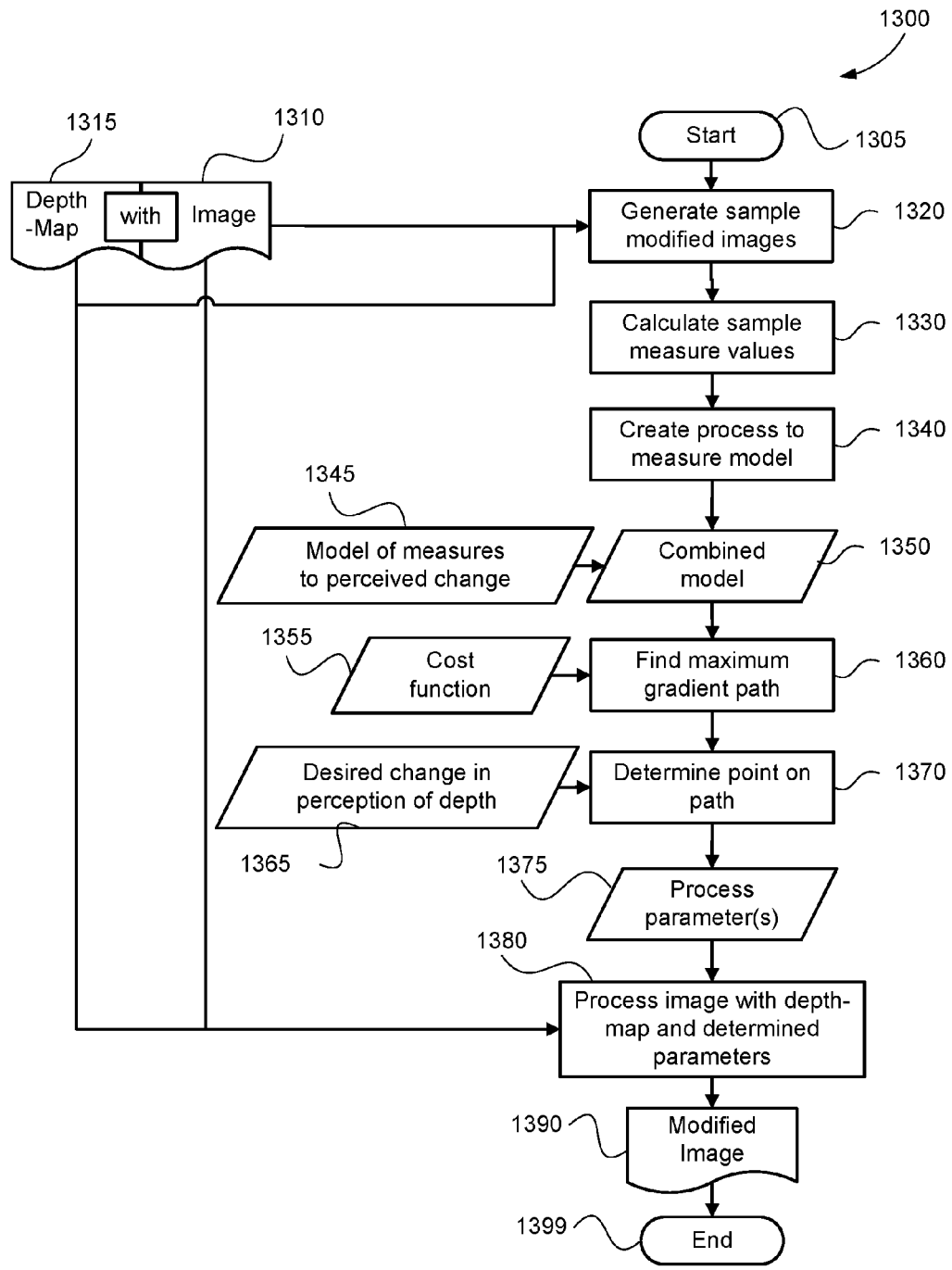
FIG. 13 is a schematic flow diagram of a method of adjusting a level of a perceptual effect in an image, using a combination of a measure based model, an image specific model and a cost function.

The arangements described may be implemented using the computer system 100 wherein the processes of FIGS. 1, 4 and 13, to be described, may be implemented as one or more software application programs 133 executable within the computer system 100. In particular, the steps of the current method are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the current methods and a second part and the corresponding code modules manage a user interface between the first part and the user.

The software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus in accordance with the current invention.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects an apparatus in accordance with the current invention.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed arrangements use input variables 154, which are stored in the memory 134 in corresponding memory locations 155, 156, 157. The arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 2 to 13 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The current method may alternatively be implemented in dedicated hardware such as one or more integrated circuits performing the required functions or sub functions. Such dedicated hardware may include graphic processors, digital signal processors, or one or more microprocessors and associated memories.

Tilt-shift and the image manipulations in FIG. 2, as discussed above, are examples of non-photorealistic image manipulations. The term "photorealistic" is used to distinguish between the appearance of an image which retains a natural or unmodified appearance, as opposed to an image which appears to have been overtly modified, or has content which appears to be overtly synthetic or artificial.

In the arrangements described, photorealistic image manipulations are employed to increase rittai-kan in the image. FIG. 2C shows a image 270, which is the result of applying further photorealistic processes to the image 230 of FIG. 2B. The combination of the non-photorealistic and the photorealistic manipulations result in even greater change in rittai-kan in the image, than with the non-photorealistic changes alone. The flower 280 and the leaf 285 have been lightened, to visually differentiate the flower from the background. The remaining background 273 inside the frame 260 has been darkened, similarly differentiating the flower from the background. The horizon line 275 has been changed from the previous appearance 235, by being blurred to de-emphasize the horizon. The remaining visible edges 295 of the triangle 290 have been blurred also.

Figure 3A:
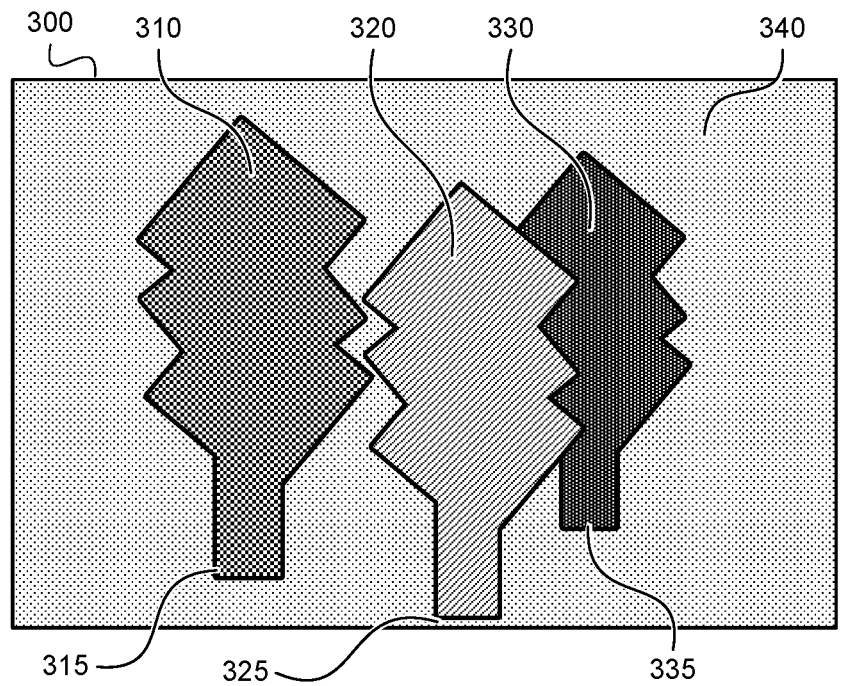
FIGS. 3A and 3B show photorealistic methods of increasing rittai-kan in an image.
Figure 3B:
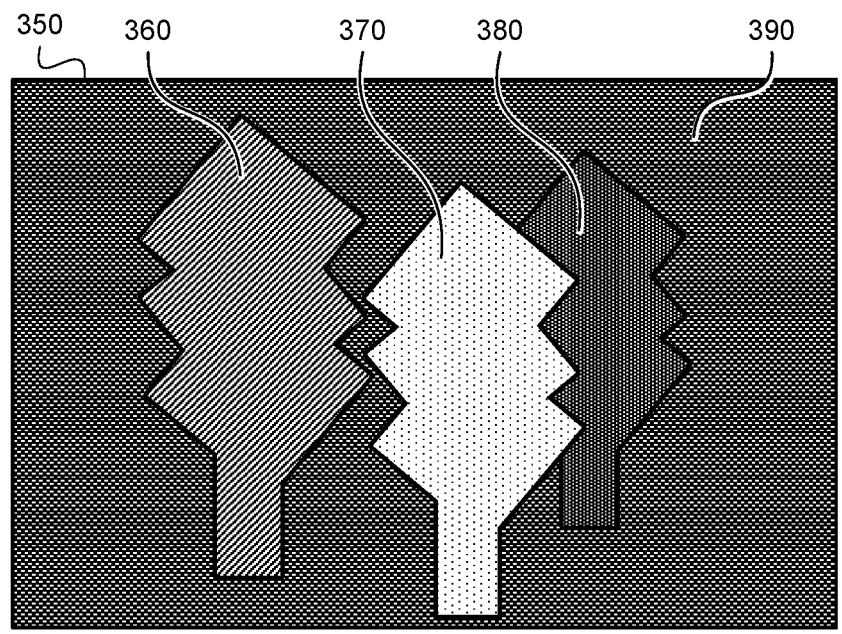

FIGS. 3A and 3B illustrate how photorealistic manipulations alone can be used to increase ritta-kan. In FIG. 3A, an image 300 is shown of three trees, 310, 320, and 330, against a background 340. The three trees can be seen to be at different depths due to the relative positions of their trunks, 315, 325, and 335, implying a ground-plane. The closest tree 320, is seen as such by the position of the trunk closest to the bottom of the image. The tree 320 is relatively light-coloured. The other two trees have different darker colourings and are at intermediate distances. The background is also relatively light-coloured.

In FIG. 3B, the same image 350 is shown after modifications have been made to the content. The foremost tree 370 has been lightened, and the background 390 has been darkened. The intermediate trees 360 and 380 have not been modified. Note that the modification is not the same as a histogram stretch or a contrast enhancement, as in the original image 300, the intermediate trees 310 and 330 were darker than the background 340. To make these modifications, a segmentation, relative depth information, and/or some knowledge of the scene is required. The modifications have increased the rittai-kan in the image.

Some examples of other photorealistic/natural aspects of images which affect how images are perceived include;
   distance-haze (also called "aerial perspective") to indicate a large distance,
   a desaturation of distant features, as with distance-haze, to indicate distance,
   a red or orange cast to indicate warmth or closeness, or conversely an increase in blueness to indicate cool temperatures or distance, and
   operations such as a contrast adjustment can affect a sense of fluctuating depth in an image.

The example processes described above modify regions of the image differently in order to separate the regions. However for some images global processes may separate the regions due to existing differences between the regions. For example, if one region is more colourful than another, then increasing saturation will have a more noticeable affect on the more colourful region, increasing the visual separation between the two.

Rittai-kan, or the sense of depth, is of particular relevance to the emboidments of the current invention and will be discussed below in more detail, but a person skilled in the art will appreciate that the concepts which will be discussed in this document are also applicable to other perceptual aspects, and across many other possible physical, aesthetic, or dynamic "impressions" that a human viewer gains from a single static image.

Figure 4A:
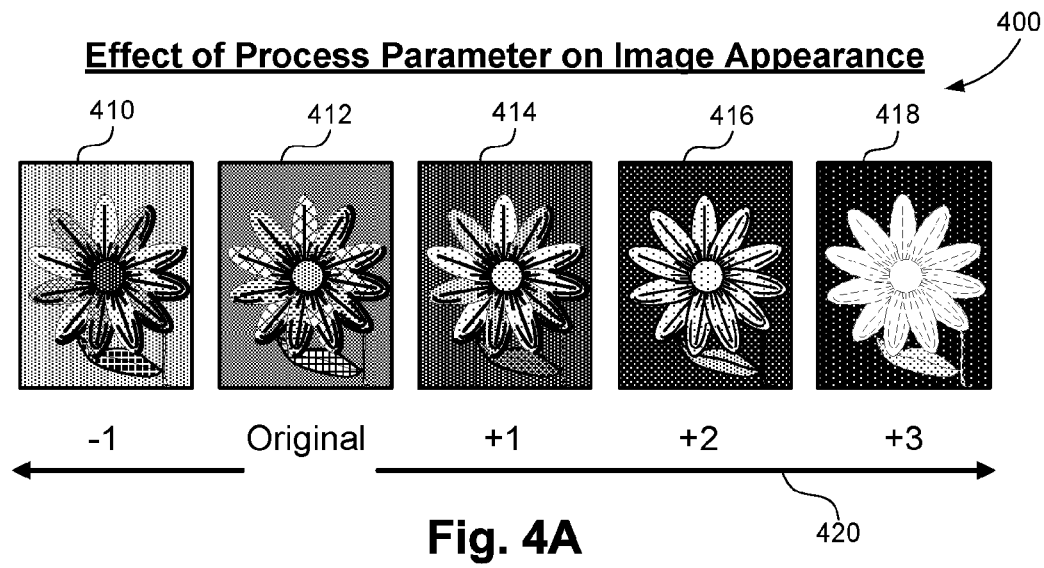
FIGS. 4A and 4B provide an illustrative example of how a range of processing parameters affects the perception of depth in an image, and how the effect can be measured via perceptual experiments.

FIG. 4A is an illustrative example 400 of the effect that a particular photorealistic image process has on the appearance of a sample image. A segmentation of the scene into foreground and background, or a depth map to differentiate foreground from background, is required. It is to be noted that a depth map can be continuous or multi-valued in nature, or binary where depth values are quantised to one of a foreground depth plane and a background depth plane. The image process illustrated is a progressive darkening of the background, coupled with a progressive lightening of the foreground. The original image is shown, 410, with a second version 412 to which an image process has been applied at a process strength of +1, 414, then again 416 at a strength of +2, and finally again 418 at a very strong level of +3, by which point the image loses photorealism. The example image process can be applied in a negative direction, by lightening the background and darkening the foreground. This is illustrated 410, with a process strength of −1. An axis 420 is shown below the row of images with markings corresponding to the strengths of the image process.

Figure 4B:
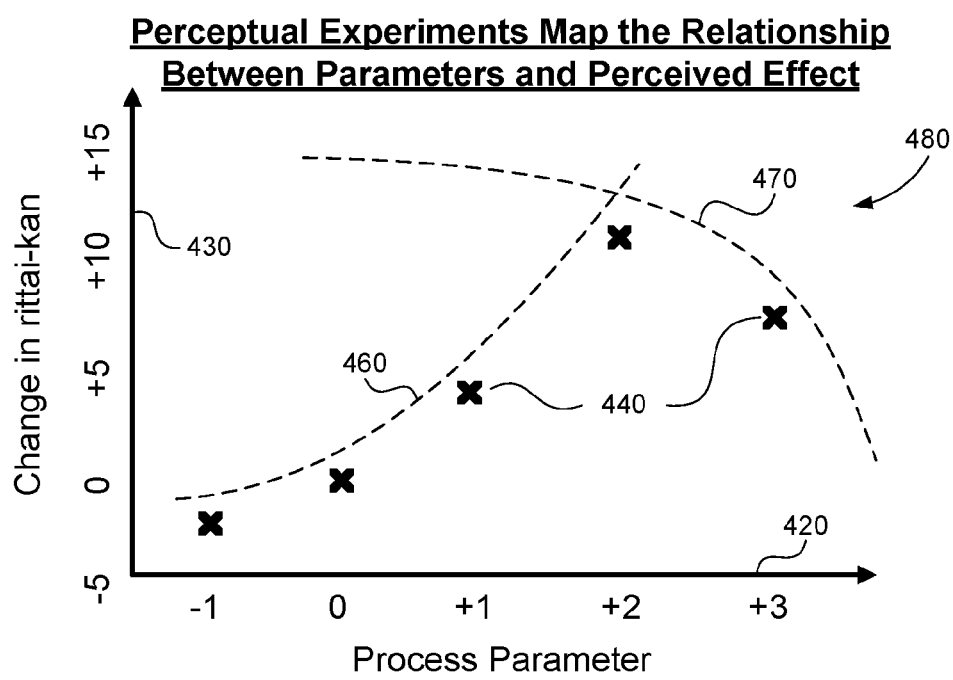

In one arrangement, the image process is applied as illustrated in FIG. 4B, whereby the foreground is always lightened and the background is always darkened, and the properties of the original image are not measured or required. In an alternative arrangement, the relative brightnesses of the foreground and the background are identified as image characteristics before image processing begins, and the image process is applied depending on those initially identified values; in this case a positive separation of brightnesses 414, 416, 418, introduces greater rittai-kan, and a negative separation of brightnesses introduces lesser rittai-kan 410.

The segmentation of the image into foreground and background components can be obtained in many ways. In one arrangement, the segmentation is manually prepared and provided to the process. In another arrangement, a user selects an object and a corresponding segmentation is calculated, such as via Graph-cut methods. In yet another arrangement, a segmentation is automatically generated. In yet another arrangement, a depth map is provided, and a segmentation is calculated based on the depth values in the scene. In yet another arrangement, a depth-map is used in place of a segmentation, and processing is applied to the image in a graded manner corresponding to the relative depth of the components.

FIG. 4B illustrates one way in which perceptual observations of the examples from FIG. 4a are used to form a model of how the perception of depth varies with a processing parameter. A scatter plot 480 is shown along the same X-axis 420 of the applied process strength as illustrated in images 410, 412, 414, 416, and 418. The vertical axis 430 is the rittai-kan (the perception of depth) resulting from the image modification. The judgement of the rittai-kan for each level of processing is gathered by showing the images to a number of observers and gathering data on their responses. A number of averaged judgements 440 on the relative perceptual effect are plotted. The reported rittai-kan level rises slowly at first at levels −1, 0, +1, and then more quickly at level +2, but then falls again at level +3. Hypotheses about trends 460 and 470 are formed as explanations of the effects; for example an increase in perceptual separation 460 occurs as the process works to improve rittai-kan photorealistically, and the reduction in the perceptual effect 470 occurs as the processing becomes too strong, reducing the photorealism of the image. It is noted that the trends 460, 470 can be used as models of the perceptual data 440 without identification of the underlying effects leading to the trends 460, 470.

Figure 10A:
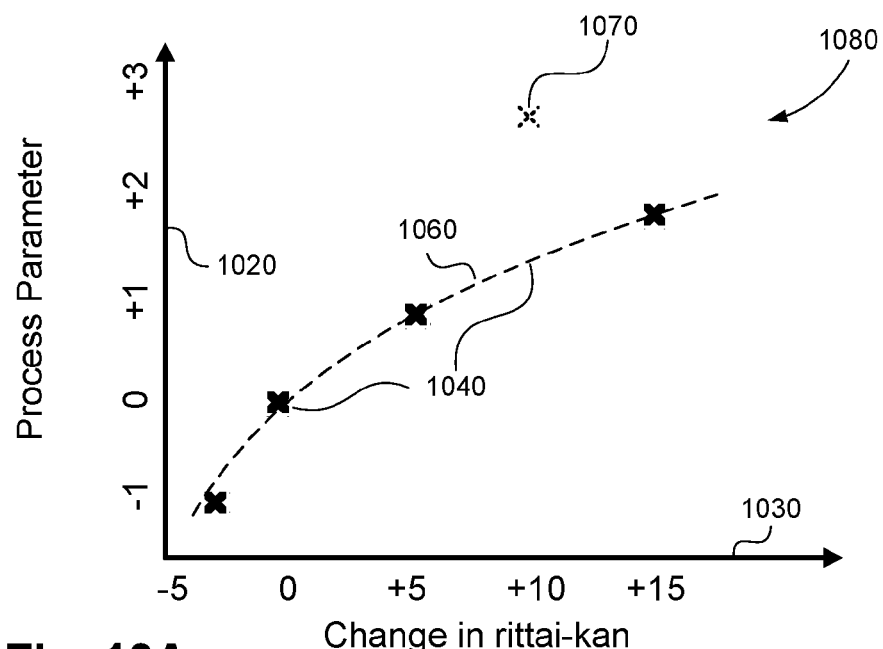
FIGS. 10A and 10B show relationships between a change in rittai-kan and a processing parameter.

FIG. 10A shows a plot 1080 of the plot 480 of FIG. 4B, transposed. In the plot 1080, the trend 460 becomes function 1060 of the process parameter to use 1020 to achieve a relative perception of depth 1030, instead of the process parameter which was used 420, and the recorded perception of depth 430 which resulted. The first few data points 1040 corresponding to levels −1, 0, +1, and +2, form the function. The last data point 1075 corresponding to level +3, has a lower level of rittai-kan than the values leading up to it, and so does not form part of the function. As in FIG. 4B the highest level of rittai-kan was at the value +2, in FIG. 10A, +2 is the highest level of processing used to achieve rittai-kan.

Figure 10B:
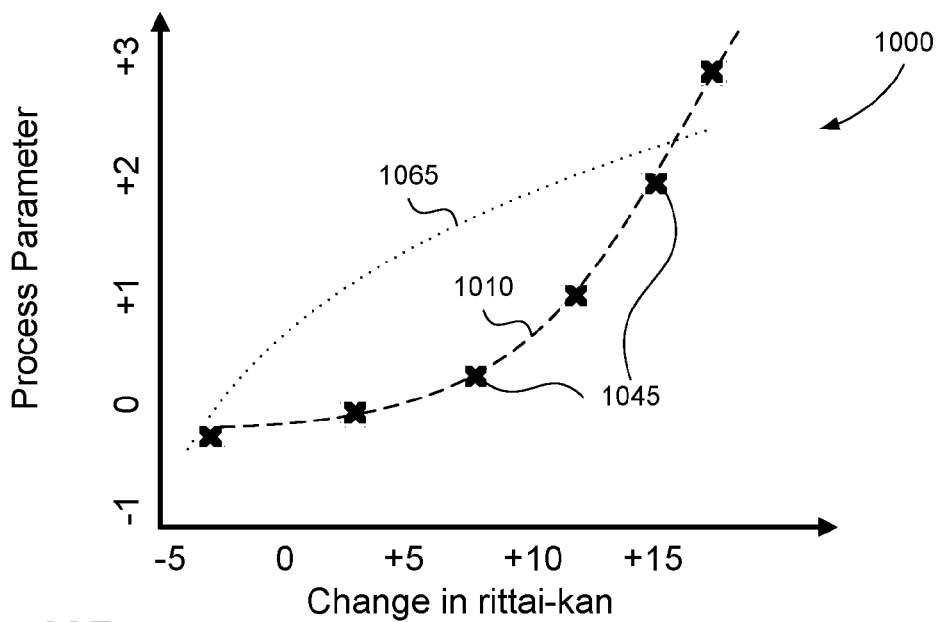

FIG. 10B repeats 1000 the plot 1080 of FIG. 10A. The function 1060 is shown 1065 for reference. If a different image with different properties is used, then a different set of observed points 1045 are gathered, resulting in a different function 1010. The properties of the second image are identified by the value 730 of a measured or provided image characteristic 730. The first function 1060 rose quickly at first, and then more slowly to a limit of +2. The second function 1010 rises slowly at first and then more quickly, and reaches level +3.

Characteristics may be measured for the chosen image, to identify the shape of the rittai-kan increase function. One type of image characteristic 720 is the relative brightnesses of the foreground and background of an image. Examples of other suitable image characteristics 720 include:

- a measure of the relative colour saturation of the foreground and the background of the image;
- the dominant colour of the entire image;
- the colour of the sky in an image, if the image contains any sky;
- the presence of skin-tones in the foreground of an image; and
- a semantic description of the image such as "portrait", "landscape", or "contains a pet animal with fur".

Figure 7B:
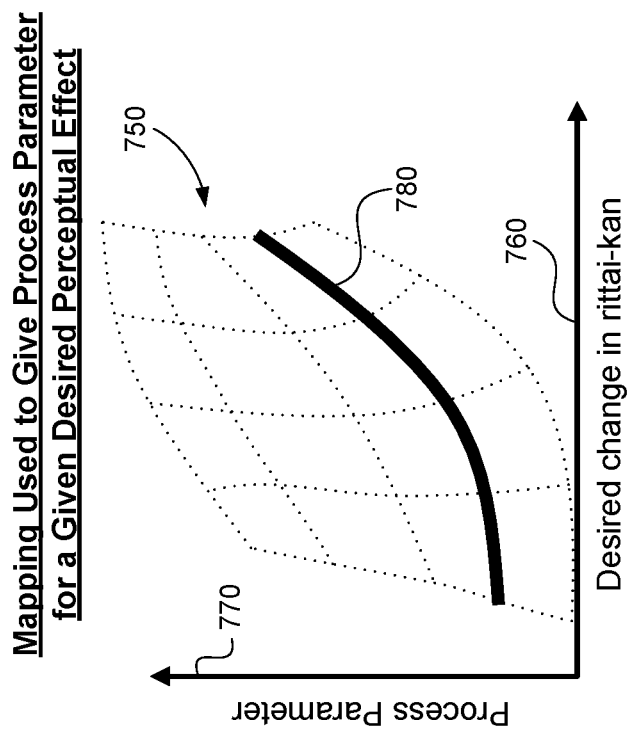
FIGS. 7A and 7B provide examples of some steps involved in defining an appropriate level of adjustment for a perceptual effect in an image.
Figure 7A:
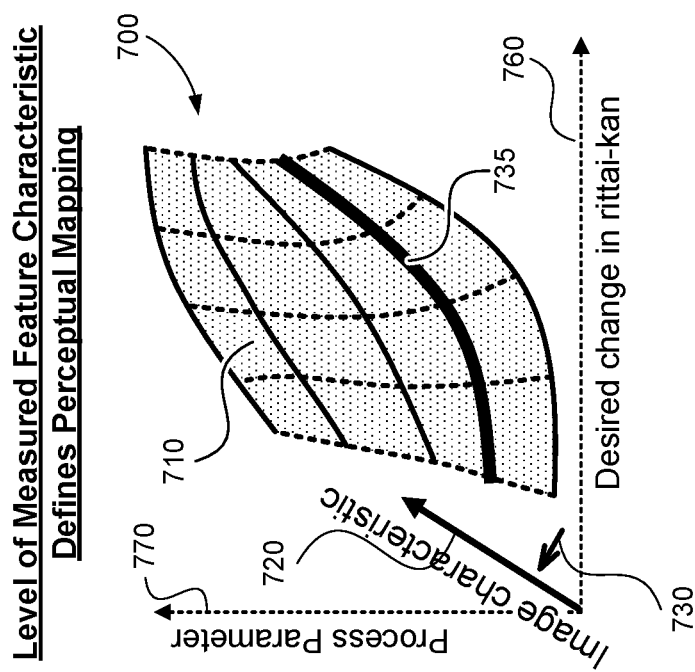

FIG. 7A shows a plot 700 containing a representation of a multidimensional model 710. The multidimensional model is represented as a curved surface. The model varies in the X direction 760 corresponding to a desired change in rittai-kan, in a Z-direction 720 shown as going into the page, corresponding to a measured characteristic of the image, and for each X and Y position, the multidimensional model has a height in the Y-direction 770, which is on the curved surface 710 corresponding to a process parameter.

Given a desired change in rittai-kan, and a value of the image characteristic, the model gives the appropriate strength of the process to apply. A value of the characteristic, 730 along the image characteristic axis 720, is highlighted, and a corresponding linear slice 735 of the multidimensional model 710 shown.

In FIG. 7B, the same plot 750 as in FIG. 7A, 700, is shown, but with the value of the image characteristic chosen, the Z-axis is removed, and a simple Y-vs-X plot is shown, with a curve representing the remaining function 780, corresponding to the slice 735.

In one arrangement, only a single image characteristic is referenced, for a model controlling only a single image process parameter, in response to the desired value of a single perceptual aspect. In this case, the dimensionalities of the models shown in plots in FIGS. 7A and 7B are as illustrated, with a 3-dimensional surface defining the values of the model, and the value of the image characteristic defining a 2-dimensional slice through the surface. In another arrangement, multiple image characteristics are used for a correspondingly higher-dimensional model, and the resulting 2 dimensional slice is the result of finding the intersections of each of the image characteristics with the model.

In one arrangement, the model comprises a set of known values, and an interpolation process is used to determine intermediate values/shape of the 2-dimensional slice. In another arrangement, a mathematical function is defined for the model, and the 2-dimensional slice results from inserting the value of the image characteristic into the equations of the model. In yet another arrangement, a fixed number of 2-dimensional models are stored in place of a higher-dimensional model, and the value of the image characteristic is matched to the nearest defined model via a lookup table. In yet another arrangement, the image characteristic is a semantic label and the model is a set of functions corresponding to the value of the semantic label.

A perceptual effect such rittai-kan is subjective, so an inexact definition may result in a poor agreement between different observers of the images. Rittai-kan may be separated into a number of "aspects", each of which may be measured and modeled separately, in order to build more-narrowed models of the relationships between chosen processes and perception. Rittai-kan is composed of at least the following three aspects:

- perceived separation of the foreground and background from each other;
- perceived geometry of an object due to shading across it; and
- perception of surface-detail;

The processes and concepts as described for FIGS. 4A, 4B, 10A, 10B, 7A, and 7B, may each be applied for each of the aspects above separately. Refinement through such a decomposition allows more-accurate models to be developed. In another implementation, only the highest-level of rittai-kan is modelled despite the lower agreement between observers, to get a more-complete definition than is possible with smaller components, and with the advantage that such a model may be formed requiring less data.

Figure 5:
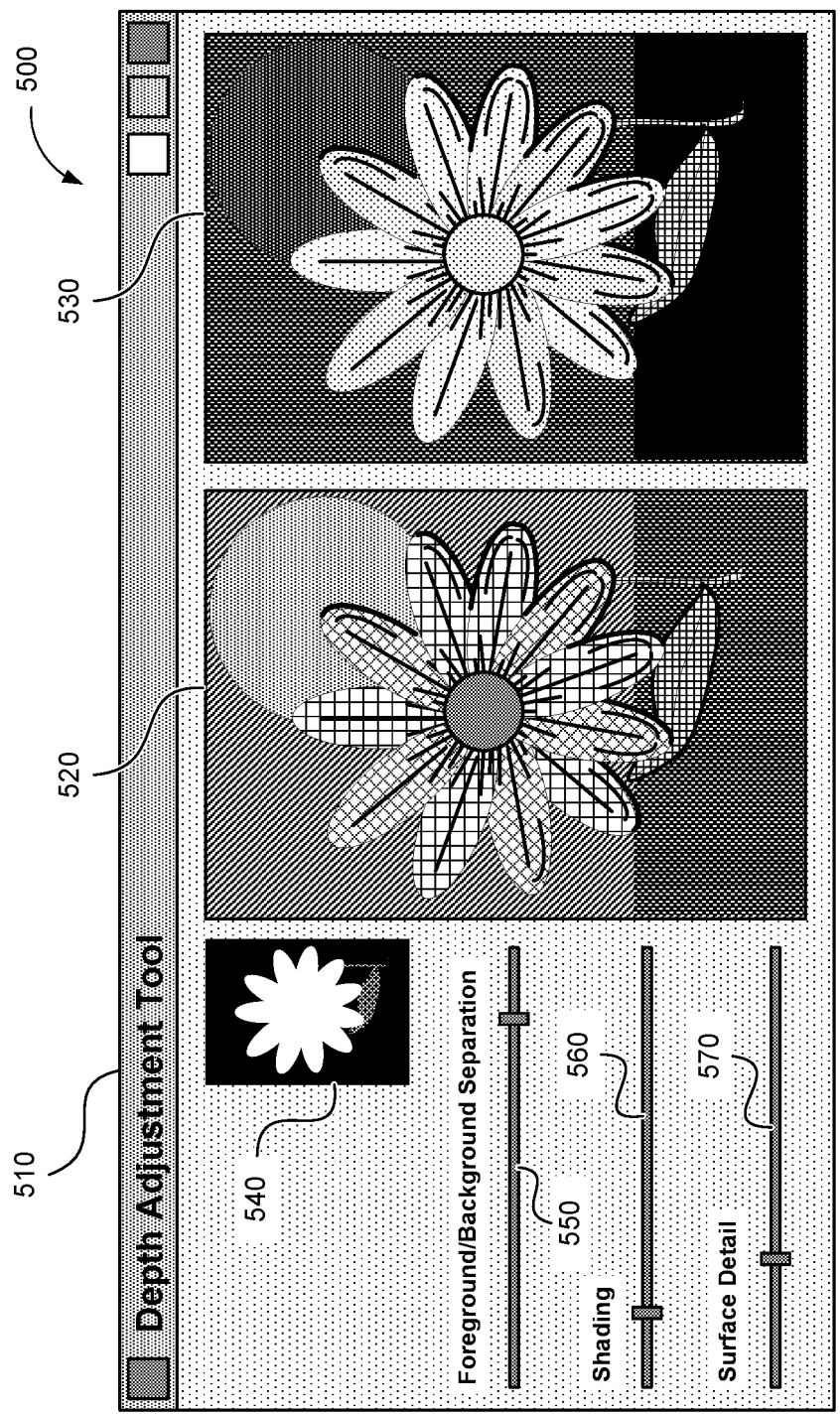
FIG. 5 shows an example of an interface for altering perceptibility of depth in an image.

FIG. 5 illustrates a user-interface 500 for an implementation of the invention. A dialog is shown 510 of the controls of a perceptual-depth adjustment tool. The unmodified image 520 is shown on screen as a reference for the user. A depth-map is also shown 540 illustrating the parts of the image that will be treated in different ways in accordance with processing techniques such as those illustrated in FIG. 4A. As the user adjusts the sliders controlling the desired changes to the perceptual levels of different aspects 550, 560, 570, a modified copy of the image 530 is shown to the user in order to allow them to judge the result. As the sliders adjust a desired change in perception, the processes are applied in nonlinear manners to the image, in accordance with the perceptual data 440 which has been gathered.

The three aspects of rittai-kan are represented in the user interface 510 with the sliders 550, 560, and 570. Through the use of psychovisual experiments involving sufficient numbers of test subjects, image manipulations associated with a particular sense have been identified as follows:

The slider controlling Foreground/Background Separation 550 relates to the perception of how clearly separate the foreground is from the background, as judged by a human observer.
Examples of visual differences which increase or decrease the perception of separation include brightness, colour differences, different levels of colour saturation, and sharpness.
The slider controlling Shading 560 relates to the perception of the shape or volume of the objects in the image. Shading is a strong visual cue for an observer to be able to deduce the geometry of an object by the differing brightnesses of different parts of the object in response to the different angles of incident light. Examples of image processes affecting the perception of shading include brightness, contrast, and local contrast adjustments such as structural-sharpening or HDR-toning.
The slider controlling Surface Detail 570 relates to the perception of nearness of an object, through the perception of the surface texture details of that object. For most naturally-textured objects, surface detail is only visible to an observer near that object, but is not visible from a distance. Examples of image processes affecting the perception of surface detail include local contrast adjustments such as structural sharpening, the addition of image noise or film-grain effects to mask existing detail, sharpening to increase the intensity of the surface detail, or smoothing and averaging operations to remove the surface detail or even to remove it entirely.

It is notable that while all three aspects are related to rittai-kan, i.e. to the perception of depth, they are each affected by different sets of processes. It is also notable that certain image processes will affect more than one aspect—for example, brightness adjustments affect separation as well as shading, local contrast affects shading as well as surface detail, and sharpening affects surface detail but also separation.

In one arrangement, a slider is used to apply modifications which result only in an increase in its perceptual effect. In another arrangement, a slider applies an increase when moved to the right of the midpoint, but is able to apply a decrease when moved to the left of the midpoint.

In one arrangement, each slider controls only one chosen process, and is scaled in strength of the process parameters in accordance with the measured effects on perception for the properties of the image. In another arrangement, a slider controls multiple processes simultaneously with predermined weightings. In yet another arrangement, a slider controls different processes when moved in different directions, or different processes along different portions of its length.

In one arrangement, the effects of the sliders 550, 560, and 570 are considered to be independent, and parameter changes to the underlying effects are accumulated between the desired actions of the three sliders. In another arrangement, the adjustment of one slider causes the independent motion of another slider in the user interface in order to illustrate to the user how the processes already applied have already affected the corresponding perceptual aspects.

In yet another arrangement, there is only a single slider controlling all three aspects equally or according to a predetermined combination or weighting of the three aspects. In yet another arrangement, there is only a single slider whose actions are image-dependant.

Figure 6:
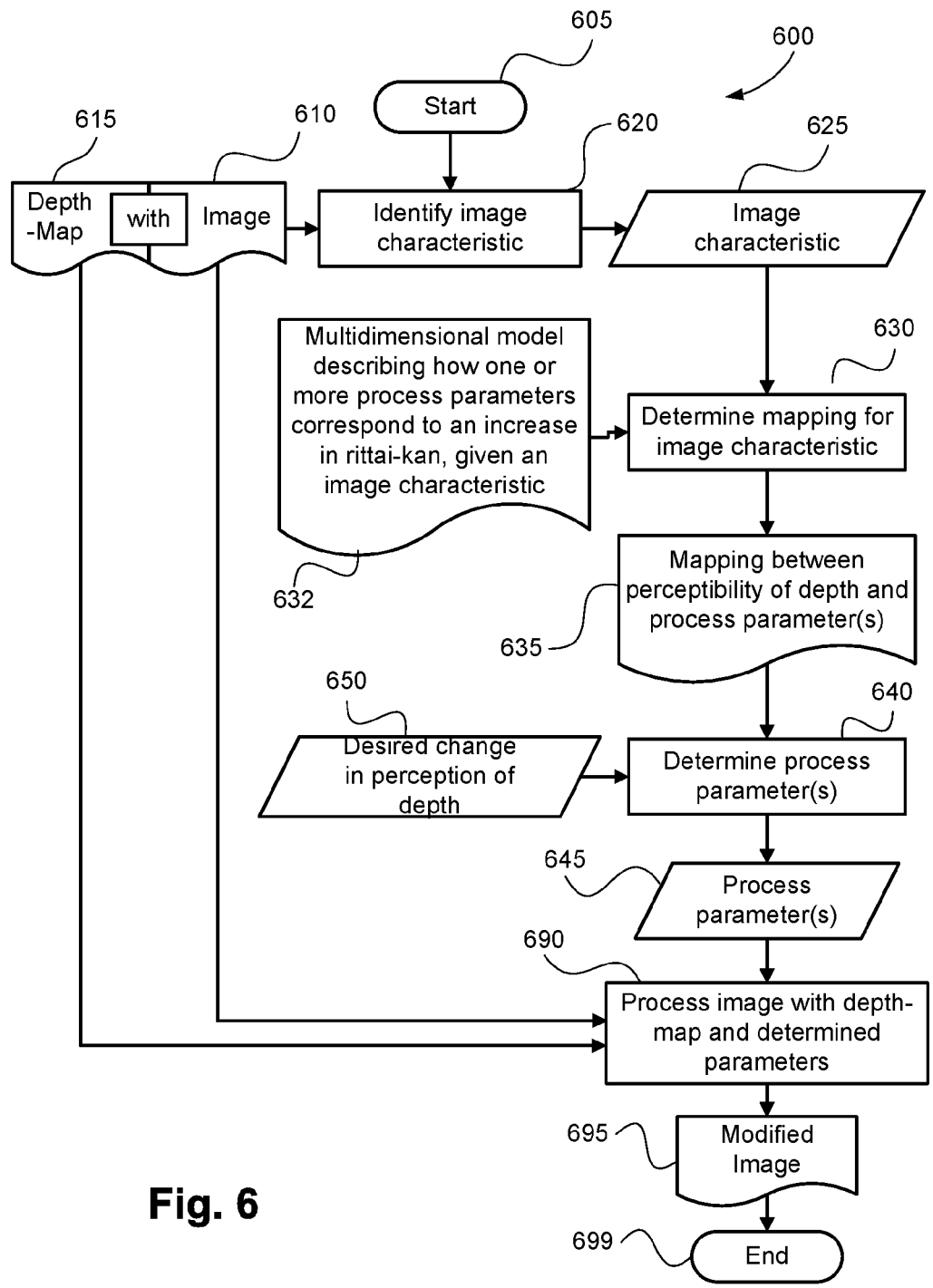
FIG. 6 is a schematic flow diagram illustrating a method of altering the level of a perceptual effect in an image using a single image process.

FIG. 6 is a schematic flow diagram 600 illustrating a method of adjusting the level of a perceptual effect in an image, say rittai-kan, using an image modification process, say brightening, in a controlled manner. The method 600 is typically implemented as one or more modules of the software 133, controlled by execution of the processor 105 and stored in the memory 106.

The method begins 605, when a user provides or specifies an image 610, which has an associated depth map 615, on which to perform the adjustment, and also specifies a desired adjustment level 650.

In one implementation, the desired change 650 to the perception of depth is supplied by the value of a slider as in the example illustrated in FIG. 5. In alternative implementations, the desired change 650 is determined in accordance with one of the following:
  processing is embedded in a device such as a camera or a printer and the desired change is at a fixed predefined value, such as +5;
  a value is chosen such that the final level of rittai-kan reaches a predefined value; and/or
  an analysis is performed on the image to determine an adjustment level beyond which the image loses its photorealism, and the level is set to a maximum level which remains below this level.

The image 610 with depth map 615 are analysed 620 to obtain the value 625 of an image characteristic, as in FIG. 7a, 730, along the axis 720 of possible values. For example, the characteristic is the existing chroma difference between the foreground and the background of the image, say 20%, indicating that the foreground is 20% more chromatic than the background.

The multidimensional model 632 is provided, as illustrated in FIG. 7a, and the characteristic value 625, 730, say 20%, is used to identify 630, 735 the mapping 780, 635. For example the mapping 635 may have a shape as in FIG. 10a which rises quickly as the brightness is increased, such that to reach a level of +5 rittai-kan, the process parameter only needs to be +1, but then rises more slowly, such that to reach a level of +15 rittai-kan only involves increasing the process parameter to +2.

To determine 640 the process parameter 645, the desired change in rittai-kan 650, such as +5, provided to the mapping 780, 635, and results in a process parameter 645, such as +2, which will produce the desired change in rittai-kan 650.

In one implementation, the mapping 635, 780, comprises a set of known values, and an interpolation process is used to find the value at other points along the function. In another implementation, the mapping 635, 780, is defined for the set of known values and the closest one is chosen via a lookup process. In yet another implementation, the mapping 635, 780, comprises a non-linear mathematical function which returns a value in response to an input value.

With the value 645 of the process parameter determined (such as +2), control passes to an image processing step 690. In the image processing step 690, the original image 610 is processed in accordance to the value 645 of the parameter, for example, by lightening, modulated by the values in the depth-map 615, to produce the modified image 695. This process is shown in more detail in FIG. 11.

Figure 11:
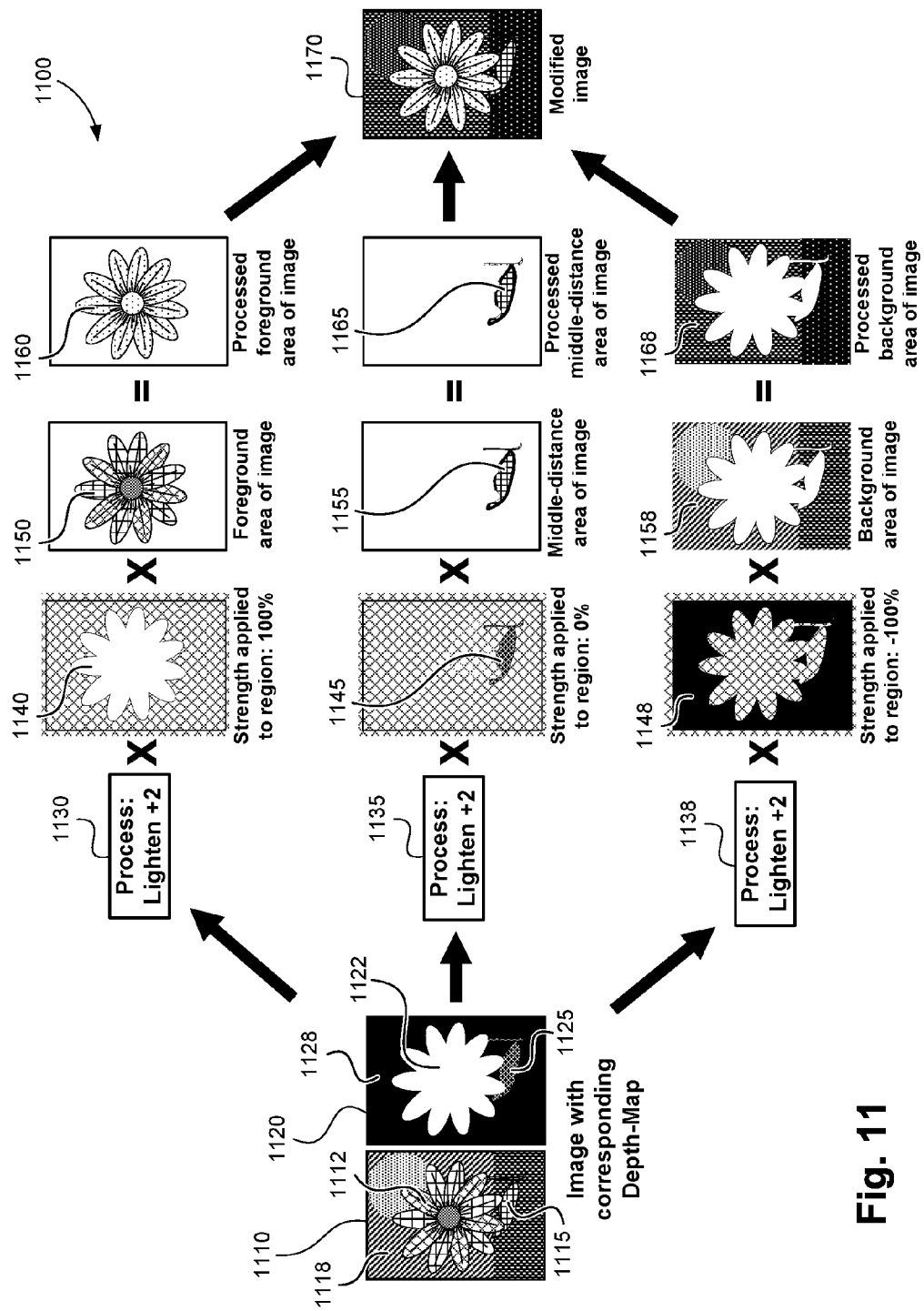
FIG. 11 shows how different segments of the same image may be processed according to corresponding segments of an associated depth map, to produce a modified image.

FIG. 11, is an illustrated flow diagram 1100 showing how an image process may be applied to an image with reference to a corresponding depth-map. We see a sample image 1110, with the flower 1112, leaf 1115, and background 1118. The corresponding depth map 1120 has a white area 1122 corresponding to the flower 1112, indicating that the flower is close, and hence in the foreground. The corresponding depth map 1120 also has a grey area 1125, corresponding to the leaf 1115, indicating that the leaf is at a middle distance. Finally, the corresponding depth map 1120 has a black area 1128, corresponding to the background 1118, indicating that the background is distant, and is indeed a background.

The method by which each of the flower, leaf, and background are processed according to their relative depths is discussed in further detail below.

A process 1130, for example, lightening, is applied with a specified level, such as +2. The nearest region of the depth map 1140 is shown independently, and is white indicating a 100% closeness level. 100% times +2 is still +2, so the foreground area of the image 1150 corresponding to the flower 1112 is lightened with the parameter +2, resulting in a lighter image of the flower 1160.

The same process (lightening, at a level of +2) is shown again 1135. The mid-distance-region of the depth map 1145 is shown independently, and is grey indicating a 0% closeness level. 0% times +2 is 0, so the foreground area of the image 1155 corresponding to the leaf 1115 is lightened with the parameter 0, resulting in no change and an identical image of the leaf 1165.

The same process (lightening, at a level of +2) is shown again 1138. The farthest region of the depth map 1148 is shown independently, and is black indicating a −100% closeness level. −100% times +2 is −2, so the background area of the image 1158 corresponding to the background 1118 is lightened with the parameter −2, resulting in a darker image of the background 1168.

The three adjusted regions of the image form the processed image 1170 with enhanced rittai-kan.

The level adjustment method 600 is now complete 699.

FIG. 8A shows a plot 800, of the trade-off between the parameters of two separate processes 810 and 820. The X-axis of the plot 820 is the process parameter value for Process 2, while the Y-axis 810 is the process parameter value for Process 1. Achieving an increase to a perceptual effect such as rittai-kan may be achieved by different combinations of Process 1 and Process 2, as shown by the curved line 830. An example is boosting the separation of the foreground and background regions of an image by changing their relative levels of saturation, or by changing their relative brightnesses. The availability of multiple processes is important because, for example, a monochromatic image will not benefit from changes to the levels of saturation, and a very bright image cannot be brightened further without losing detail in bright regions. Even for an image with mid-range levels of colour and brightness however, multiple processes allow more-effective image manipulation than any one process alone, or can produce a more-preferred effect.

A perceptual effect such as rittai-kan can be reached at the same level but in different ways. An equivalently-increased result can be achieved with, for example, 90% of a first process and 20% of a second process, or equally by 80% of a first process and 40% of a second process, or equally by only 5% of a first process and 70% of a second process. Note that the combination of processes is non-linear with the example numbers quoted, which do not add to 100%.

Returning to FIG. 8A, the desired effect is shown to be achieved by a certain level 840 of Process 1 alone, or by a certain level 845 of Process 2 alone. There is, in fact, a relationship between the levels of the two processes, 830, in that any combination of the two processes defined by that relationship 830, will result in the same level of the desired effect.

FIG. 8B illustrates why the relationship 830 is valuable. In the plot of FIG. 8B, 801, we see the same relationship 830 between the same two axes representing the same two processes 810, 820. Three points along the relationship curve 830 are highlighted however, representing three different, but significant relative weightings of the process parameters:

In one implementation, a combination of parameters 850 is chosen which achieves the desired effect in the most efficient way; with the least visible change to the image. Different processes cause different perceived levels of change to an image at different process levels, an effect which is separate to the change in rittai-kan. As an example, the image may be differentially lightened as in FIG. 11, which at small levels will not result in visibly-modified image, but will noticeably increase the rittai-kan. Conversely, an image with an existing large separation in brightness will suffer visible artefacts from additional lightening, without gaining any significant rittai-kan. Models of the perceptibility of introduced changes by a process, are used to define this point 850 along the relationship 830.

In another implementation, a different combination of parameters 855 is chosen which achieves an equivalently-strong effect, that requires the least total amount of processing of the image, to minimise the artefacts produced. Modifications such as saturation or brightness changes, increase the visible level of detail of poorly-saturated or dark regions of an image respectively causing perceptible degradation of the image. The combination of parameters 855 along the possible relationship 830 is chosen to achieve the desired level of the effect while introducing a minimum amount of perceived degradation to the image.

In yet another implementation, another different combination of parameters 858 is chosen which achieves an equivalently strong effect in a combination that is the most aesthetically-pleasing. For certain types of image content, different processes have different levels of desirability, regardless of the visibility of the change or the degradation of the image content. For example, an image containing a human face will not be aesthetically preferred after a strong adjustment to saturation, as it will affect the appearance of the skin in an unnatural manner, while adjustments to the brightness will not share this problem. Such a combination of parameters 858 along the possible relationship 830 is chosen to achieve the desired level of the effect in the most aesthetically-pleasing/preferred manner.

In yet another implementation, the processes available have different known effectivenesses, and the most effective process is applied preferentially to achieve as much of the effect as possible, within predetermined limits of how strongly the result may be affected. If the desired level of the effect has not been reached even when the process has reached its limit, the second-most effective process is applied to increase the level of effect further. If a third process is available, and is the third-most effective process, then it is applied in turn, etc. In this implementation, such a decision process is used to achieve an equivalently strong effect with a minimum of different processes applied, thus saving on computational complexity.

It will be appreciated by persons skilled in the art, that other possible rules/restrictions may be placed on the possible combinations of parameters to define other significant points along the relationship 830 between to processes 810 and 820 to achieve a desired level of effect subject to other considerations not described here.

For any pair of processes, the relationship mapping different combinations of parameters to multiple different levels of desired effect can be determined. FIG. 8C is an illustration of a 3-dimensional plot 802, showing the relationship between a first process parameter 810 shown as a Y-axis going into the page, and a second process parameter 820 shown as an X-axis along the bottom, and a vertical Z-axis pointing upwards 860, representing the level of the perceptual effect. The relationship between the processes is also mapped out at different levels, shown as a surface 880 bounded by the axes, touching the origin, and rising upwards. One level of perceptual effect is highlighted as a horizontal plane 865, intersecting the surface 880 along a line 838. The relationship used in the previous examples 830 is shown as a level of perceptual effect higher than this on the surface 880, and other lower levels are also shown 835.

FIG. 8D shows a different view 803 of the same plot 802 from FIG. 8c, being the plot 802 from FIG. 8C, viewed directly from above, such that the vertical axis 860 is not visible. The axes for the two processes 810 and 820 form the axes of this two dimensional plot as before in FIGS. 8A and 8B, and the relationship previously discussed 830 is shown as before. Additional lines of equal perceptible effect are shown on this plot 835 and 838, as in the plot 802 in FIG. 8C. These lines show the interactions of the two processes to achieve different levels of the perceptual effect. The examples of different significant points along the relationships, 850, 855, 858, from FIG. 8B, are extended to cross other lines of perceptible effect 835 and 838. It can be seen that given a choice of restriction as described for points 850, 855, 858, a curved path is mapped out from the origin passing through the significant points. Such a path is shown 870, intersecting the iso-rittai-kan line 830 at a point 890. This path gives the relative combination of two parameters to be used for a desired perceptual effect, given a desired restriction. A model representing such a path, or a rule for defining such a path, is a necessary additional piece of information required in order to perform the invention with two or more processes.

The model representing the path 870 is stored as a number of predetermined points at incremental values of rittai-kan increase, intermediate values are obtained by interpolation. In another implementation, the model representing the path 870 is stored as a mathematical function with predetermined parameters, and the appropriate combination of parameters is output as the result of providing a desired increase of rittai-kan to the function. In yet another implementation the model representing the path 870 is stored alongside the definition of the surface 880 and similarly depends on the image characteristic. In yet another implementation the model representing the path 870 has a higher dimensional definition, and is defined directly without a separate definition of the surface 880.

Figure 14:
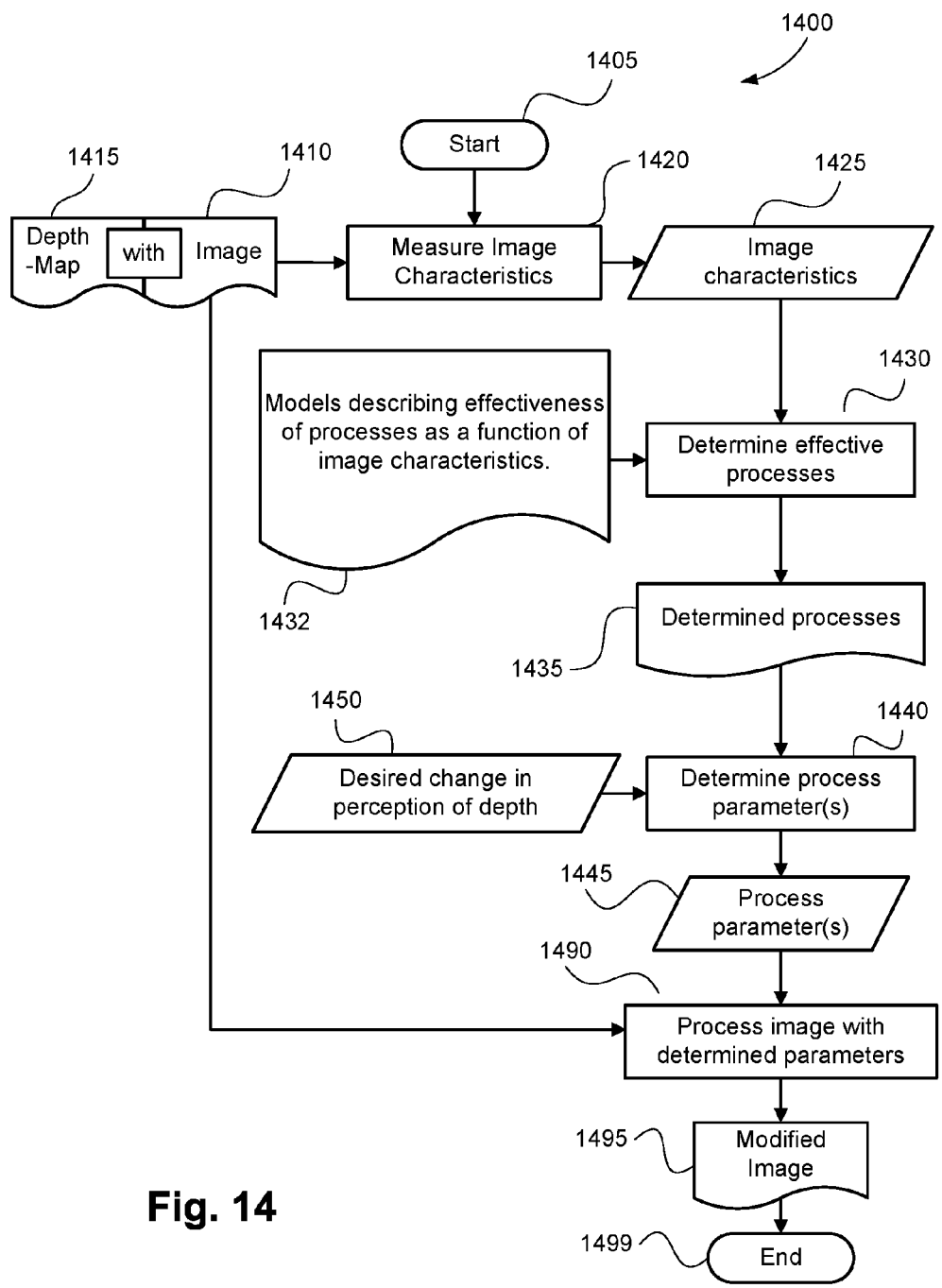
FIG. 14 is a schematic flow diagram of a method of adjusting the level of perceived depth in an image, using image modification processes.

FIG. 14 is a schematic flow diagram illustrating a method 1400 of adjusting a level of perceived depth in an image, using image modification processes, such as birghtness adjustment, contrast adjustment or saturation boost, in a controlled manner. The method 1400 is typically implemented as one or more modules of the software 133, controlled by execution of the processor 105 and stored in the memory 106.

The method 1400 begins 1405, when a user provides or specifies an image 1410, which has an associated depth map 1415, on which to perform the adjustment, and also specifies a desired adjustment level 1450.

First, a number of characteristics of the image 1425 are measured 1420. The measurement of these characteristics considers the depth map. For example, pixels in the foreground may be given a positive weight, while pixels in the background are given a negative weight. This weight may be binary (either −1 or 1 for background and foreground), may be multi-valued but discrete (representing a set of depth planes), may be proportional to the depth, or may be proportional to a nonlinear function of the depth. The depth may also be included in the characteristic calculation directly, such as by calculating features based on three dimensional superpixels.

These characteristics are used to determine 1430 which processes 1435 will be effective at modifying the perceived depth of the image. This determination is based on models 1432 which estimate the effectiveness of each process on an image, as a function of the image characteristics 1425.

Parameters 1445 are then determined 1440 for each of the processes. The determination of parameters is based on the desired change in perception of depth 1450, in a manner identical to step 650 of process 600.

These processes 1435 are then applied 1490 with the parameters 1445 to the image 1410 to produce the modified image 1495. This ends 1499 the method 1400.

In a second arrangement, choice of parameters is achieved for multiple processes in combination, for example, both lightening and chroma increase, in a controlled manner.

Figure 12:
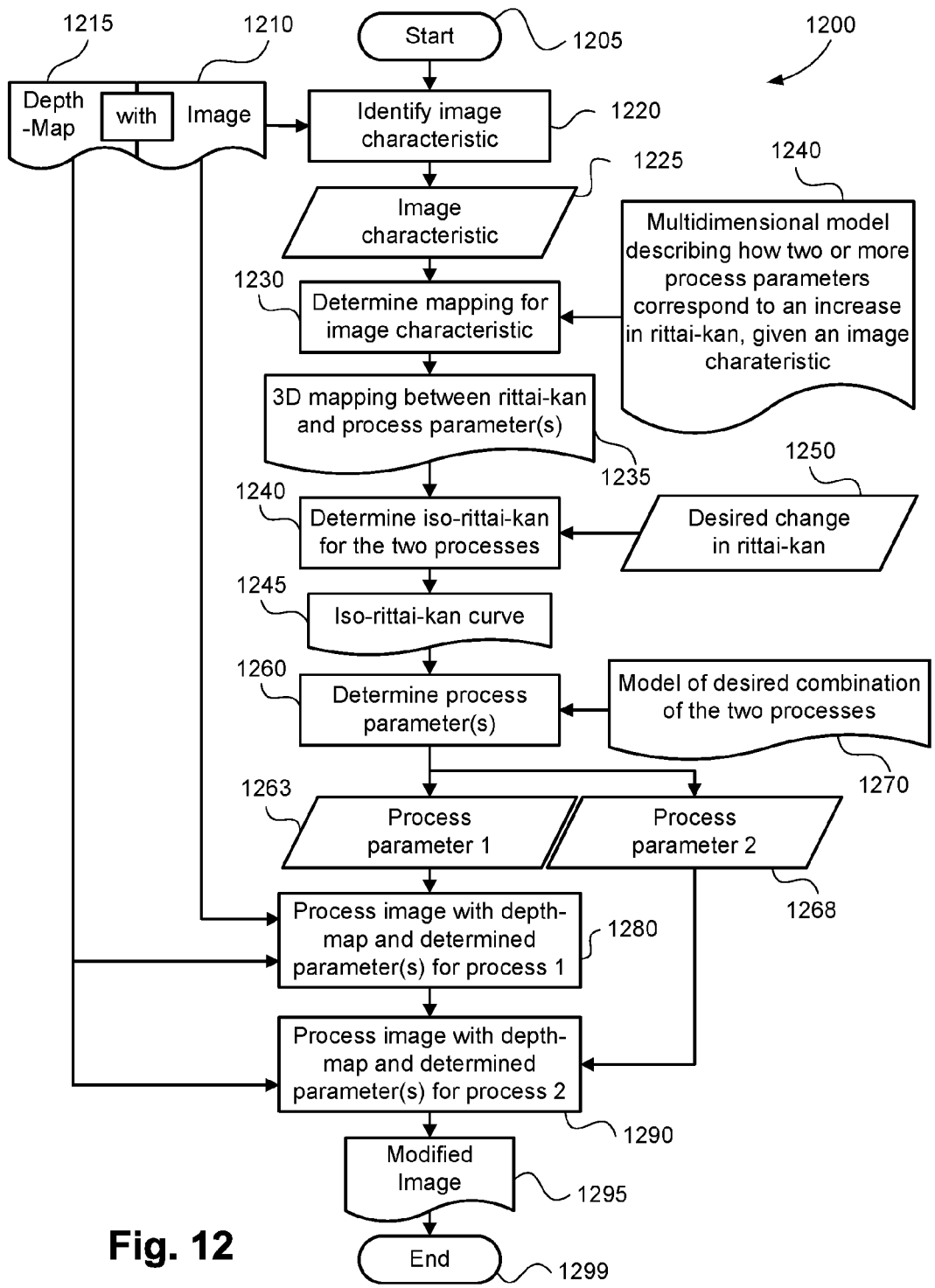
FIG. 12 is a schematic flow diagram of a method of altering a level of a perceptual effect in an image using two image processes.

FIG. 12 is a flow-chart illustrating a mthod 1200 of how an image is modified using two processes together. The method 1200 is typically implemented as one or more modules of the software 133, controlled by execution of the processor 105 and stored in the memory 106.

The method 1200 begins 1205 in a manner similar to that of FIG. 6, when a user provides or specifies an image 1210, which has an associated depth map 1215, on which to perform the adjustment, and also specifies a desired adjustment level 1250.

In one implementation, the desired change 1250 to the perception of depth is supplied by the value of a slider as in the example illustrated in FIG. 5. In another implementation, processing is embedded in a device such as a camera or a printer and the desired change is at a fixed predefined value, say +5. In yet another implementation, a value is chosen such that the final level of rittai-kan reaches a predetermined level. In yet another implementation, an analysis is performed on the image to determine an adjustment level beyond which the image loses its photorealism, and the level is set to a maximum level which remains below this level.

The image 1210 with depth map 1215 are analysed 1220 to obtain the value 1225 of an image characteristic, for example, the existing chroma difference between the foreground and the background of the image, say 20%, indicating that the foreground is 20% more chromatic than the background.

The multidimensional model 1240 is provided, as a three-dimensional volume, and in a process analogous to the process as illustrated in FIG. 7A, the image characteristic value 1225, say 20%, is used to identify 1230 the mapping 1235. For example the mapping 1235 may be a surface with a shape as in FIG. 8C, 880.

Next, the desired increase in rittai-kan 1250, such as +5, is provided to a determination step 1240, to determine an appropriate curve of equal rittai-kan relating the two process parameters, such as lightening and chroma increase. This is as illustrated in FIG. 8C, selecting a level 865 which intersects the mapping surface 880 at a curve 838 along which the increase in rittai-kan is constant for the different relative proportions of the two processes. The iso-rittai-kan curve 1245 is shown in the flowchart 1200, output from step 1240.

With the iso-rittai-kan curve 1245, a model 1270 of the desired combination of processes is used in the next step 1260, to determine the parameters 1263, 1268 for the two processes. This is performed as illustrated in FIG. 8C, where the iso-rittai-kan curve 830 intersects the model of process combination 870, at a point 890. The point 890 lies on the plane of process parameter 1 and process parameter 2, thus specifying unique values for each, such as brightening of +2, and a chroma increase of −1.

The value 1263 of the first process parameter, such as +2, is given to the first image processing step 1280. At step 1280, the image 1210 is processed, such as by lightening modulated by the depth map 1215, as illustrated in FIG. 11. The value 1268 of the second process parameter, such as −1, is given to a second image processing step 1290 which further processes the image 1210 with the depth map 1250, by, for example, changing the chroma in accordance with the depth map values. The result after processing by both the first process 1280 and the second process 1290, is a modified image 1295.

The rittai-kan change method 1200 is now complete 1299.

In a third arrangement, the choice of parameters is chosen using a method 1300 as described in FIG. 13. The method 1300 is typically implemented as one or more modules of the software 133, controlled by execution of the processor 105 and stored in the memory 106. The method 1300 begins 1305 when a new image 1310 with depth map 1315 is provided which the user intends to modify.

In step 1320, sample modified images are generated according to a predetermined pattern of parameter values. A regular grid may be used, or other sampling approaches may be taken. For three parameters for example, the following fourteen sets of parameter values based on the face-centered cubic lattice may be used, where the full range of values for each process parameter is represented by the range 0,1: (0,0,0), (0,0,1), (0,1,0), (1,0,0), (0,1,1), (1,0,1), (1,1,0), (1,1,1), (0.5,0.5,0), (0.5,0.5,1), (0.5,0,0.5), (0.5,1,0.5), (0,0.5,0.5), (1,0.5,0.5)

For the method 1300, a model 1345 is used which relates a set of measures for an original and a modified image to a predicted change in perceived depth. The measures used in this model may be any values which can be calculated for a pair of original and modified images, and may make use of an associated depth map. The measures estimate the levels of particular processes applied to the image, and may in addition, or alternatively, measure other characteristics of the image which impact the perception of or changes in perception of depth. The model 1345 is developed from training based on the results of a psychophysical experiment in which images are modified, and observers report the perceived change in depth. Suitable measures are then selected based on their ability to predict the reported perceived change in depth.

In step 1330, measure values are calculated for each of the sample modified images created in step 1320. The measures calculated correspond to the measures used in the model 1345.

In step 1340, a set of models relating process parameters to measure values for the given image 1310 is created based on the sample measure values. One model is created for each measure, where the inputs to each model are the process parameters and the output of each model is an estimated measure value. These models may be created for example by finding the best fit quadratic function between the parameter values and the measure. For three parameter values for example, this gives a model with 10 terms, for which the fourteen sample values described earlier should be sufficient.

A combined model 1350 is created which relates process parameters to an estimated perceived change in depth for the image 1310. This model is created by composing the model from process parameters to measures with the model from measures to a perceived change in depth.

In step 1360, a maximum gradient path is calculated. This path starts at the parameter values which represent no change to the image, and which should according to the model correspond to no perceived change in depth. The path then follows the direction of maximum increase in perceived change. Alternatively, a cost function 1355 can be used to represent the desirability of a modification to the image in ways other than the resulting perceived change in depth. For example, it may be desirable to minimise the total change to the image as measured by the Euclidean distance between the process parameter values. In that case the cost function is constant and the path will follow the maximum gradient. Alternatively, the total change to the image can be measured in other ways which better correspond to human perception of the amount of change made to the image. In that case, the path would maximise the ratio between the perceived change in depth and the perceived amount of change made to the image. Another alternative would be to consider preference. A model may be provided which relates a set of process parameters to an estimated preference level for the modified image. In that case, the path would maximise a combination of estimated change in perceived depth and estimated change in preference level.

One approach to calculate the maximum gradient path for a mathematically simple model and mathematically simple cost function is to solve the following system of differential equations, where p(t) represents the path vector ($p_1(t)$, $p_2(t)$, . . . $p_n(t)$) for n process parameters parameterised by the variable t, $m(x_1, x_2, \ldots x_n)$ represents the modelled perceived change in depth as a function of the process parameter values $\{x_1, x_2, \ldots, x_n\}$, and $c(x_1, x_2, \ldots x_n)$ represents the cost function:

$$\frac{\partial p}{\partial t} = \nabla\left(\frac{m(p)}{c(p)}\right),$$

$$\left\|\frac{\partial p}{\partial t}\right\| = 1,$$

$$p(0) = 0$$

For sufficiently mathematically simple models, a solution to this differential equation may be found analytically. For more complex models, the solution may be approximated numerically. An approximate path may also be calculated directly by starting at p=0, and at each step calculating the gradient $\nabla(m(p)/c(p))$ and taking a small step in the direction of the gradient. The path may be extended to cover a decrease in perceived depth by considering t<0 for the analytic solution, or by stepping in the direction of the negative of the gradient.

In step 1370, a desired change in perception of depth 1365 is received. The value t is identified such that the modelled perceived change in depth m(p(t)) for the point p(t) on the path p is equal to the desired change in perception of depth 1365. It should normally be expected that the estimated perceived change in depth m(p) is monotonically increasing along the path p such that only one such value t exists. However, if multiple values oft exist, due to a complicated cost function c or due to approximation errors, the value closest to zero should be chosen. The point on the path p(t) for the chosen value of t provides the process parameters 1375.

Step 1380 is then identical to step 690. The image is processed using the process parameters 1375, resulting in a modified image 1390.

If the user desires multiple changes to perceived depth for a particular image, steps 1370 to 1390 may be performed multiple times for different levels of desired change without needing to repeat steps 1320 to 1360. This may be advantageous as steps 1320 to 1360 may require a substantial amount of processing time to perform, which in some contexts or applications, may be unsuitable.

The arrangements described above may form a stand-alone tool with a user-interface as shown in FIG. 5.

In another application, the arrangements described may be implemented on a consumer camera and enabled by selection of an "effect" or "mode", which indicates that the rittai-kan level should be increased by a number of perceptual levels, such as +2.

Figure 9A:
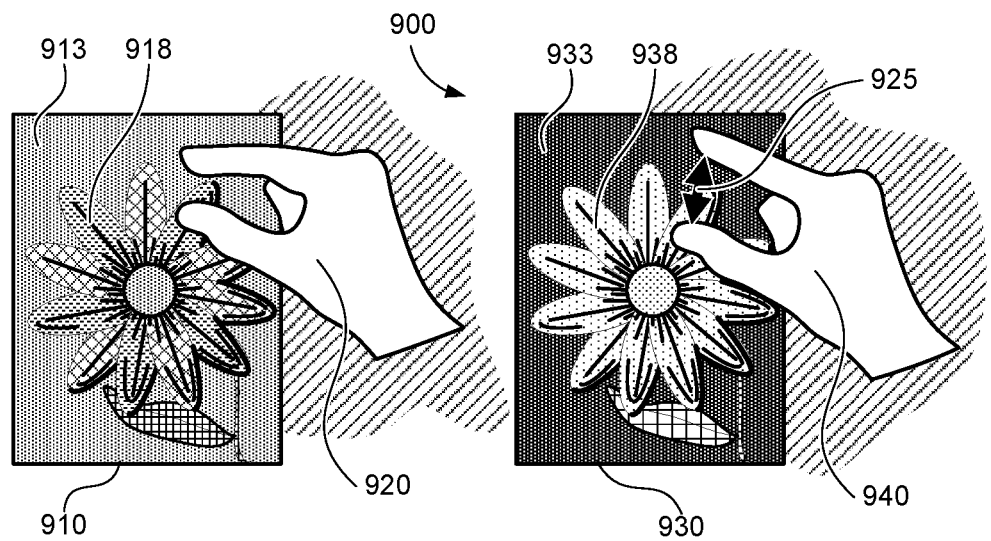
FIGS. 9A and 9B show two user interfaces for effecting a change in rittai-kan in an image.

In another application, is the arrangements described are implemented on a device with a touch screen, and a change in rittai-kan is effected with a gesture 900 as in FIG. 9*a*. An image 910 comprising a foreground 918, say an image of a flower, and a background 913, is displayed on screen. A hand 920 is shown with one finger on each of the foreground 918 and background 913. When the fingers 940 pinch outwards 925, the foreground area 938 is brightened, and the background area 933 is darkened, according to the invention.

Figure 9B:
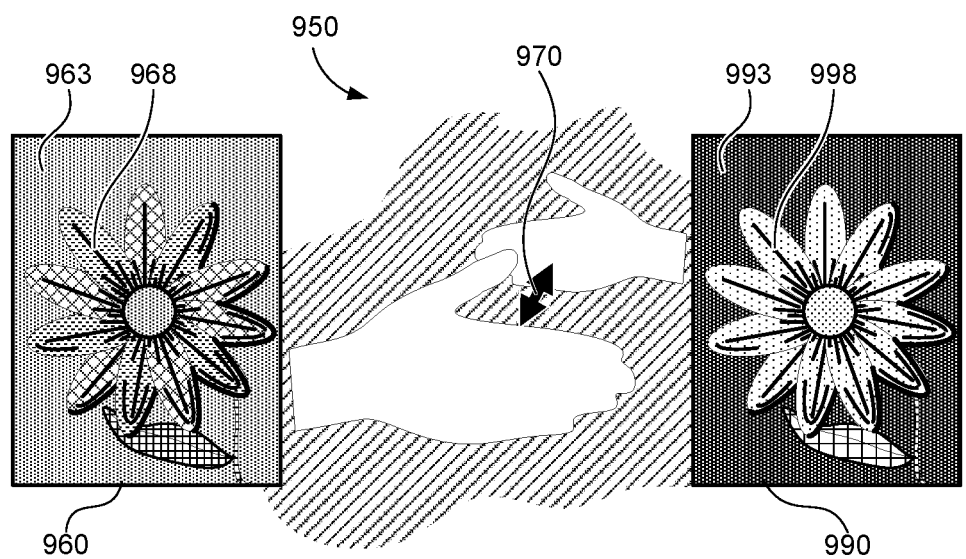

In yet another application, the arrangements described are implemented on a device with gesture recognition, and a change in rittai-kan is effected with a gesture 950 as in FIG. 9*b*. An image 960 comprising a foreground 968, such as an image of a flower, and a background 963, is displayed on screen. A gesture 970 is made implying a three-dimensional change in depth, as illustrated with one hand moving towards the screen and the other hand moving away from it. The result is an image 990 in which the foreground area 998 is brightened and the background area 993 is darkened (without applying a three-dimensional change), to increase rittai-kan.

The arrangements described are applicable to the computer and data processing industries and particularly for the image processing industries.

The foregoing describes only some embodiments of the present invention, and modifications and/or changes can be made thereto without departing from the scope and spirit of the invention, the embodiments being illustrative and not restrictive.

The invention claimed is:

1. A computer-implemented method of altering objects in an image, the method comprising:
   receiving a requested change in the objects in the image;
   receiving a depth map corresponding to the image;
   determining at least one characteristic of the image; and
   applying an image process to the image, the image process varying in strength according to the depth map, and in accordance with a non-linear predetermined mapping relating a strength of the applied image process to a change in the objects, the mapping being determined with respect to the determined at least one characteristic,
   wherein the non-linear predetermined mapping identifies a peak change in the objects in the image associated with the at least one characteristic of the image at a particular strength of the applied image process.

2. The computer-implemented method according to claim 1, wherein the at least one characteristic is determined with respect to a foreground region and a background region of the image.

3. The computer-implemented method according to claim 1, wherein application of the image process to the image is a local application limited to one of a foreground and background region of the image.

4. The computer-implemented method according to claim 1, wherein the image process relates to one of clarity, sharpness, colour shift, saturation, brightness, exposure, noise, contrast and vibrance of the image.

5. The computer-implemented method according to claim 1, wherein the requested change in the objects relates to foreground/background separation, a visual cue associated with an appearance of volume in objects in a scene of the image, and a visual cue associated with an appearance of physicality in object textures of the image.

6. A computer-implemented method of altering objects in an image, the method comprising:
   receiving a requested change in the objects in the image;
   determining at least one characteristic of the image based on a measured difference of the at least one characteristic in a foreground region of the image and a background region of the image;
   selecting an image process for altering the objects in the image, said selected process having a different impact in the foreground region and the background region of the image as a result of the determined at least one characteristic in the regions; and
   applying the image process globally to the image, in accordance with a non-linear predetermined mapping relating a strength of the globally applied image process to a change in the objects,
   wherein the non-linear predetermined mapping identifies a peak change in the objects in the image associated with the at least one characteristic of the image at a particular strength of the globally applied image process.

7. A computer-implemented method of altering objects in an image, the method comprising:
   receiving a requested change in the objects in the image;
   determining at least one characteristic of the image; and
   applying a combination of at least two image processes to the image, wherein a process strength of the combination is determined in accordance with corresponding non-linear predetermined mappings relating the strengths of the at least two applied image processes and the objects in the image, said mappings being determined with respect to the determined at least one characteristic,
   wherein the non-linear predetermined mappings identify a peak change in the objects in the image associated with the at least one characteristic of the image at a particular strength of the combination of the at least two image processes.

8. The computer-implemented method according to claim 7, wherein the at least two image processes are each associated with a predetermined effectiveness measure, and wherein the strengths of the applied image processes are determined according to the associated effectiveness measure.

9. A computer-implemented method of interacting with an image displayed on a display screen to alter objects in the image, said method comprising:
   receiving a selection of a region of the displayed image and an indication associated with a requested change in the objects in the image; and
   applying an image process to the selected region of the image to change the objects of the image, wherein size and position of the objects in the image remain constant,
   wherein a strength of the applied image process corresponds to a peak change in the objects in the image associated with a non-linear predetermined mapping relating the strength of the applied image process to a change in the objects.

10. The computer-implemented method according to claim 9, wherein the indication is received in the form of at least one of a gesture, a voice command to an object, and a vocal request to an image of a person in the image.

11. The computer-implemented method according to claim 9, wherein the indication is received in the form of ray-casting from a user gesture.

12. The computer-implemented method according to claim 9, wherein the indication is received in the form of a pinch gesture.

13. The computer-implemented method according to claim 9, wherein the region of the image is selected by at least one of user indication and automatic segmentation.

14. A non-transitory computer readable medium having a program stored thereon for altering objects in an image, the program comprising:

code for receiving a requested change in the objects in the image;

code for receiving a depth map corresponding to the image;

code for determining at least one characteristic of the image; and code for applying an image process to the image, the image process varying in strength according to the depth map, and in accordance with a non-linear predetermined mapping relating a strength of the applied image process to a change in the objects, the mapping being determined with respect to the determined at least one characteristic, wherein the non-linear predetermined mapping identifies a peak change in the objects in the image associated with the at least one characteristic of the image at a particular strength of the applied image process.

15. Apparatus for altering objects in an image, the apparatus configured to:

receive a requested change in the objects in the image;

determine at least one characteristic of the image based on a measured difference of the at least one characteristic in a foreground region of the image and a background region of the image;

select an image process for altering the objects in the image, said selected process having a different impact in the foreground region and the background region of the image as a result of the determined at least one characteristic in the regions; and apply the image process globally to the image, in accordance with a non-linear predetermined mapping relating a strength of the globally applied image process to a change in the objects, wherein the non-linear predetermined mapping identifies a peak change in the objects in the image associated with the at least one characteristic of the image at a particular strength of the globally applied image process.

16. A system comprising:

a memory for storing data and a computer readable medium; and a processor coupled to the memory for executing a computer program, the program having instructions for:

receiving a requested change in the objects in the image;

receiving a depth map corresponding to the image;

determining at least one characteristic of the image; and applying an image process to the image, the image process varying in strength according to the depth map, and in accordance with a non-linear predetermined mapping relating a strength of the applied image process to a change in the objects, the mapping being determined with respect to the determined at least one characteristic, wherein the non-linear predetermined mapping identifies a peak change in the objects in the image associated with the at least one characteristic of the image at a particular strength of the applied image process.

17. A computer-implemented method of processing an image, the method comprising:

receiving a requested change in objects in the image;

receiving a depth map corresponding to the image;

determining a value of at least one characteristic of the image using the image and the corresponding depth map, wherein the value of the at least one characteristic is related to colour-based properties of the image derived using the corresponding depth map; and applying an image process to the image, the image process varying in strength based on the depth map and the requested change in the objects of the image, and in accordance with a non-linear predetermined mapping relating a strength of the applied image process to a change in the objects, the mapping being determined with respect to the determined value of the at least one characteristic.

18. The computer-implemented method according to claim 17, further comprising:

selecting a plurality of processes to apply to the image based on the value of the at least one characteristic.

19. The computer-implemented method according to claim 18, further comprising:

determining a plurality of combinations of parameters for the selected plurality of processes, wherein each combination results in the requested change in the objects of the image;

selecting a combination of parameters from the determined plurality of combinations for the selected plurality of processes based on a predetermined restriction.

20. The computer-implemented method according to claim 19, wherein the restriction is determined with respect to the value of the at least one characteristic.

21. The computer-implemented method according to claim 19, wherein the restriction is determined based on a total change to the image required by the combination.

* * * * *